United States Patent [19]

Kajita

[11] Patent Number: 5,556,547

[45] Date of Patent: Sep. 17, 1996

[54] METHOD OF IMPROVING THE CONTAMINANT RESISTANCE OF A SMECTITE CLAY BY REWETTING AND IMPREGNATING THE CLAY WITH A WATER-SOLUBLE POLYMER, AND REDRYING THE POLYMER-IMPREGNATED CLAY

[75] Inventor: Laura Kajita, St. Charles, Ill.

[73] Assignee: AMCOL International Corporation, Arlington Heights, Ill.

[21] Appl. No.: 330,315

[22] Filed: Oct. 27, 1994

Related U.S. Application Data

[62] Division of Ser. No. 128,598, Sep. 29, 1993, Pat. No. 5,407,879.

[51] Int. Cl.$^6$ ..................................................... C02F 11/00
[52] U.S. Cl. .............................................. 210/751; 502/62
[58] Field of Search ................................ 210/751; 502/62

[56] References Cited

U.S. PATENT DOCUMENTS

| | | | |
|---|---|---|---|
| 2,367,384 | 1/1945 | Tymstra et al. | 210/1 |
| 2,672,442 | 3/1954 | Clem | 252/8.5 |
| 3,487,928 | 1/1970 | Canevari | 210/40 |
| 4,021,402 | 5/1977 | Clem | 260/42.12 |
| 4,149,968 | 4/1979 | Kupiec et al. | 210/28 |
| 4,332,693 | 6/1982 | Piepho | 252/181 |
| 4,415,467 | 11/1983 | Piepho | 252/181 |
| 4,462,470 | 7/1984 | Alexander et al. | 175/72 |
| 4,517,094 | 5/1985 | Beall | 210/664 |
| 4,613,542 | 9/1986 | Alexander | 428/290 |
| 4,624,982 | 11/1986 | Alexander | 524/446 |
| 4,650,590 | 3/1987 | Beall | 210/691 |
| 4,669,920 | 6/1987 | Dymond | 405/264 |
| 4,964,918 | 10/1990 | Brown et al. | 106/811 |
| 5,114,893 | 5/1992 | Hughes | 501/149 |
| 5,120,344 | 6/1992 | Libor et al. | 71/27 |
| 5,312,807 | 5/1994 | Hughes | 507/100 |
| 5,318,953 | 6/1994 | Hughes | 507/100 |
| 5,407,879 | 4/1995 | Kajita | 502/62 |

FOREIGN PATENT DOCUMENTS

| | | |
|---|---|---|
| 0495108A1 | 7/1992 | European Pat. Off. . |
| 1439734 | 6/1976 | United Kingdom . |

*Primary Examiner*—Asok Pal
*Attorney, Agent, or Firm*—Marshall, O'Toole, Gerstein, Murray & Borun

[57] ABSTRACT

A method of treating a water-swellable clay after the clay has been mined and dried to improve its properties when in contact with contaminated water. After the common initial drying of the clay to a moisture content of 12% by weight or less, the clay is impregnated with an aqueous solution containing a dissolved, water-soluble polymer, in an amount of at least about 0.5% by weight based on the dry weight of the clay, and the clay is wetted to a moisture content of more than 12% by weight, preferably at least about 15% or more, based on the dry weight of the clay, and then redried to a moisture content of 12% by weight or less, based on the dry weight of the clay. This rewetting step to hydrate and polymer-impregnate the clay, and then redrying the clay, unexpectedly improves the contaminated water absorbency, and viscosity properties when the clay is in contact with contaminated water; unexpectedly increases the rheology properties of the clays for oil well drilling fluids and lost circulation fields when contaminated water is encountered during drilling, enhances the clay properties when used as a suspending agent in the cosmetics and pharmaceutical industries when the composition contains a dissolved, inorganic salt and/or an organic liquid; and provides unexpectedly increased contaminated water-absorption in forming water-swellable clay-based water barriers.

17 Claims, 11 Drawing Sheets

METHOD OF IMPROVING THE CONTAMINANT RESISTANCE OF A SMECTITE CLAY BY REWETTING AND IMPREGNATING THE CLAY WITH A WATER-SOLUBLE POLYMER, AND REDRYING THE POLYMER-IMPREGNATED CLAY

This is a divisional of U.S. application Ser. No. 08/128,598, filed Sep. 29, 1993, now U.S. Pat. No. 5,407,879.

FIELD OF THE INVENTION

The present invention is directed to a method of improving the contaminated water absorption ability of smectite clays, preferably a water-swellable smectite clay, such as sodium bentonite, and a method of improving the adsorption ability and flocculating capability of non-swelling smectite clays, such as calcium bentonite clays. The preferred method of improving water-swellable smectite clays, in accordance with the present invention, includes the steps of drying the mined water-swellable clay, homogeneously mixing the dried clay with a water-soluble polymer, then rewetting the clay and polymer with water to impregnate the clay with the water-dissolved polymer, and then redrying the clay. The processed, rewetted, polymer-impregnated, and redried water-swellable clay is unexpectedly better for use as a contaminated water-absorbent or barrier for the formation of ponds, lagoons and hazardous waste containment areas; for use in oil well drilling fluids wherein contaminated water is encountered during drilling; for use in lost circulation fluids where contaminated water is encountered in drilling; for use as a contaminated water-absorbing material to form a contaminated water barrier in panels, and in flexible, multi-layer articles; for use in contaminated water-absorbent articles, such as diapers, tampons and the like; and for any other purpose and in any environment wherein a water-swellable clay is used for its water-absorption properties for absorption of contaminated water. For use in improving the absorbing capability and the ability to flocculate with other particles of smectite clays, the clay, e.g., calcium bentonite, optionally, is first acid-activated, dried to a moisture content of about 12% by weight or less, mixed with a water-soluble polymer, and rewetted to a moisture content of at least about 15% by weight to solubilize the polymer, and impregnate the clay with the polymer, followed by redrying.

BACKGROUND OF THE INVENTION AND PRIOR ART

Water-swellable smectite clays have a great number of industrial uses that rely upon the ability of the clay to absorb many times its weight in water. Such water-swellable clays, such as sodium bentonite, however, lose much of their absorbency if the water absorbed is contaminated with water-soluble metal salts of alkali metals or alkaline earth metals, particularly the sulfate or halide salts, such as sodium chloride, magnesium chloride, calcium bromide, calcium chloride, potassium chloride, salt-containing body fluids and the like. Some bentonite clays, such as the blue bentonites disclosed in Clem U.S. Pat. No. 2,672,442, have required the uptake of calcium ions to provide acceptable water swellability and colloidal properties for industrial acceptance. The process of the present invention surprisingly provides bentonite clays, especially calcium bentonite and highly water-swellable sodium bentonite clays, with the sustained ability to absorb contaminated water and/or adsorb contaminants from the contaminated water.

The preferred smectite clays useful as starting materials in accordance with the present invention are non-blue sodium bentonites (green to greenish yellow to yellow to cream colored) that have industrially acceptable water swellability and colloidal properties and have a $Fe^{+3}/Fe^{+2}$ ratio greater than 1, preferably at least 3, and most preferably in the range of about 5 to about 15. However, the process and product of the process of the present invention are useful to improve one or more characteristics, particularly contaminated water absorbency or adsorbency, of any smectite clay, particularly the highly water-swellable sodium bentonites for water absorbency, calcium bentonites for contaminant adsorbence, and blue bentonites, as will become more apparent from the data of the examples. Some of these industrial uses for the treated smectite clays of the present invention, where once dried clays, e.g., sodium bentonite, have their absorbency or contaminant adsorbency adversely affected upon contact with contaminated water, are described as follows.

Clem U.S. Pat. No. 4,021,402 discloses combining bentonite clay with a water-soluble polymer and a dispersing agent to enhance the absorption of salt-contaminated water. Alexander U.S. Pat. Nos. 4,613,542 and 4,624,982 disclose slurrying a water-swellable clay and a water-soluble anionic polymer in water to inhibit the swelling of the water-swellable clay for easier impregnation of a water-penetrable article with the clay slurry. Subsequent heating of the impregnated article breaks down the polymer to revert the clay to water-swellable. Slurrying of the clay in accordance with U.S. Pat. Nos. 4,613,542 and 4,624,982 completely hydrates the clay to a water content of at least 150%, based on the dry weight of the clay, and temporarily inhibits the water-swellability of the clay. This complete rewetting of the clay to such a high water content would not be useful in accordance with the present invention since the subsequent redrying step would be extremely costly and would impregnate the clay with a polymer solution that would be too dilute to achieve the advantages disclosed herein.

1. Drilling Muds

In drilling wells by rotary methods it is a common practice to circulate, continuously, a drilling mud or fluid into and out of a borehole during the drilling operation. The drilling mud is pumped into a drill pipe from a mud pit and the mud passes down to the bottom of the borehole. The drilling mud then flows upwardly through an annular space between the borehole wall and the drill pipe, and finally flows from the borehole through a mud ditch back to the mud pit, wherein the mud is mechanically or chemically treated before recirculation through the borehole.

The drilling mud serves several purposes that influence such factors as the drilling rate, cost, efficiency and safety of the operation. The drilling mud lubricates and cools the drill bit, acts as a vehicle to carry cuttings from the borehole, and provides sufficient equalizing hydrostatic pressure against the formation wall to prevent the borehole wall from cave-in during drilling. By using proper mud formulations, the borehole entry of gases and fluids encountered in the surrounding earthen formations pierced by the drill is inhibited and possible collapse or blowouts resulting from uncontrolled influxes of these formation fluids may be prevented. The drilling mud also exerts a "wall-building" effect whereby it often forms a thin filter cake on a borehole wall, thus sealing off the borehole and reducing water loss to the penetrated formations.

An acceptable mud must have body yet be free-flowing with relatively low viscosity in order to facilitate pumping.

The mud must also have an acceptable gel strength in order to suspend solid material if circulation is interrupted and to prevent accumulation of solids at the drill bit to avoid mechanical jamming. Acceptable drilling muds may be either oil-based or water-based, and they are normally treated to provide the rheological properties that make them particularly desirable and useful for drilling wells. For example, drilling muds may be treated with barium sulfate (barite) or lead sulfide (galena) to increase their density.

The efficiency of the drilling process is related to the velocity of the mud flowing up the annular space between the borehole wall and drill pipe. This velocity is in turn related to the viscosity, density and flow properties of the mud. In addition, the drilling mud viscosity is known to depend upon the quality, concentration and state of dispersion of the colloidal solids of the mud. As the drilling operation proceeds, the rheological properties of the mud may be adversely affected by such factors as the nature of the drilled strata, loss or gain of water to the mud, chemically-active contaminants that may flocculate the mud, mud pH, and the increasing temperatures and pressures encountered at deeper drilling depths. In order to maintain workable viscosities, the muds must be formulated to respond to varying circumstances and conditions encountered during use. Since improvements in efficiency are realized as the viscosity and density of a mud are increased, it is desirable to optimize drilling mud formulations to possess the highest viscosity and density workably feasible for a given formation at a given depth.

Whenever possible, usually for reasons of economy, water-based drilling muds are used throughout the drilling operation. The suspending solids in water-based drilling muds are typically clays from the kaolinite, montmorillonite or ilite groups. These clays impart desirable thixotropic properties to the drilling mud and also coat the walls of the well with a relatively impermeable sheath, commonly called a "filter cake", that retards fluid loss from the well into the formations penetrated by the well. These properties of the suspended, water-swellable clays are substantially adversely affected by contact of the clay with salt-contaminated water resulting in less clay swelling and concomitant lower viscosity and more fluid loss.

An exemplary montmorillonite clay that can be used in a water-based drilling mud is a sodium bentonite. The bentonite is dispersed within the water-based liquid as colloidal particles and imparts various degrees of thixotropy to the drilling mud. Sodium bentonite, and other water-swellable bentonite clays, after processing by adding a water-soluble polymer to the clay and then rewetting the clay with water, and redrying, have excellent rheological properties for use in preparing aqueous drilling muds despite contact with contaminated water during the drilling process.

2. Lost Circulation Fluid

One difficulty often encountered in rotary drilling operations involves the loss of unacceptably large amounts of the drilling mud into a porous or cracked formation penetrated by the drill. The loss of drilling mud is termed "lost circulation", and the formation is termed a "lost circulation zone" or a "thief formation".

Lost circulation occurs when the well encounters a formation either having unusually high permeability or having naturally occurring fractures, fissures, porous sand formations, cracked or cavernous formations or other types of strata characterized by crevices, channels or similar types of openings conducive to drilling fluid loss. In addition, it is also possible for a formation to be fractured by the hydrostatic pressure of the drilling mud, particularly when a changeover is made to a relatively heavy mud in order to control high internal formation pressures.

When lost circulation occurs, the drilling mud pumped into the well through a drill string enters the cracks in a cracked formation or the interstices of a porous formation and escapes from the wellbore, therefore precluding return of the drilling mud to the surface. In the most severe situation, the lost circulation zone takes the drilling mud as fast as it is pumped into the wellbore, and, in the less severe situations, circulation of the drilling mud can be greatly reduced, and eventually result in a shutdown of drilling operations. Normally, the maximum amount of drilling mud loss that is tolerated before changing programs is approximately one barrel per hour. If a greater amount of drilling mud is lost, corrective measures are needed. Drilling generally is not resumed until the thief formation is closed off and circulation of the drilling mud reestablished.

The interruption of normal circulation prevents the removal, by entrainment, of cuttings and other materials from the borehole, leads to reduced hydrostatic pressure possibly followed by the influx into the wellbore of high pressure formation fluids, can result in the flooding of oil-producing zones with mud or the like, and may eventually cause the drill string to become stuck in the borehole. Even in situations where circulation is not completely lost and some drilling mud can return to the surface, the drilling mud flowing into the lost circulation zone must be replaced continuously. If the drilling mud loss is sufficiently high, the cost of continued drilling or well operation may become prohibitive. Therefore, the-lost circulation of drilling mud is a condition that must be prevented or be corrected as quickly as possible.

The best method of controlling lost circulation is to conduct a drilling program such that mud loss will not occur. However, situations exist wherein even correct drilling techniques cannot avoid lost circulation. Therefore, many methods have been used in attempts to plug the cracks or interstices of lost circulation zones to prevent the escape of drilling muds. As a result, a wide variety of materials have been pumped into the well with the drilling mud in an effort to bridge or fill the cracks or interstices of thief formations. It has been found that some materials are successful under certain drilling conditions, yet the same material is unsuccessful under other drilling conditions.

One common method is to increase the viscosity of the drilling mud or to increase the resistance of the drilling mud to flow into the formation. Another technique involves the addition of a bulk material, such as cottonseed hulls, cork, sawdust, perlite, ground walnut shells, hay, wood shavings, granular plastic, vermiculite, rock, mica flakes, leather strips, beans, peas, rice, sponges, feathers, manure, fish scales, corn cobs, glass fiber, asphalt, ground tires, burlap or other fabrics to the drilling mud. By adding these fibrous, flaky or granular solids to the drilling mud and pumping the resulting mixture into the borehole, a bridge or mat forms over the cracks or interstices responsible for drilling mud escape.

Although lost circulation zones frequently are plugged by such bulk materials, successful plugging of the thief formation is not assured. Even if large volumes of a solids-containing drilling mud are pumped into the borehole, a bridge or mat may never form over the cracks or interstices of the thief formation. Moreover, the introduction of large quantities of a drilling mud containing a relatively high percentage of bulky solids can produce pressure surges that cause further fracturing and therefore result in additional fissures for even greater drilling mud losses. Bulk materials also have proven unsuccessful in sealing off porous formations because they have a tendency to deteriorate under the high drilling pressures, and therefore decrease in volume and become slimy so as to "worm" into the formation openings without forming an effective seal.

Bentonite clay and a water-soluble polymer, mixed together, then rewetted with water in an amount sufficient to solubilize the polymer, thereby impregnating the rewetted clay with the polymer, followed by redrying the clay, as described in more detail hereinafter, gives the processed clay the ability to continue to increase the viscosity of aqueous liquids, with time, so that the clay will continue to swell upon entering the interstices of a thief formation for effective plugging despite contact with contaminated water during the drilling process.

3. Water Absorbency and Swellability

Water-swellable clays rewetted while the clay is in sufficient contact with a water-soluble polymer, so that the solubilized polymer impregnates the clay, and thereafter redrying the clay, in accordance with the principals of the present invention, provides the processed clay with new and unexpected water-absorbency and swellability when contacted with contaminated water, making the clays very useful for a number of industrial products and processes. The water-swellable clays rewetted to impregnate the clay with a water-soluble polymer, and redried in accordance with the principles of the present invention, provide unexpected water absorbency of contaminated water, and swellability upon contact with contaminated water making the clays very suitable for use in moisture impervious rigid and flexible water sealants or barriers, such as rigid or flexible panels, flexible water barriers formed by sandwiching the treated water-swellable clays of the present invention between two fabric layers, with or without needle-punching the fabric together, and the like; for preventing water contaminated with industrial waste, including metal salts, from seeping through soil containing one or more of the treated water-swellable clays; for waterproofing compositions in non-viscous sprayable forms, or paste or putty-like forms, capable of being applied by spray methods, caulking gun, or trowel; for use together with one or more elastomers and/or plasticizers for preventing the seepage of contaminated water through the compositions; together with other additives such as xanthan gum and/or other gums for maintaining stability in contaminated water; together with other components to manufacture a flexible grout composition for sealing drill holes contaminated with contaminated water; and for use as a water-swellable material in a layered water-sealing article of manufacture to prevent seepage of contaminated water therethrough.

4. Stabilization, Solidification and/or Thickening of Waste Sludges

Smectite clays, particularly smectite organoclays formed by reacting a smectite clay with a quaternary ammonium compound, are useful for physically trapping fluid wastes and spills, particularly organic wastes. For example, a smectite clay or an organophilic smectite clay can be mixed with aqueous or organic wastes for adsorption of the waste by the clay. ASTM Paint Filter Liquids Test #9095 tests the stabilized, thickened sludge to determine if any free liquid will fall through a supporting 60 mesh conical screen in 24 hours. Generally, about 5% to about 100% by weight smectite, based on the weight of the sludge, is mixed with the sludge for solidification. Usually an organophilic smectite clay is needed to sufficiently thicken a sludge containing organics to pass the Paint Filter Liquids Test #9095. Usually, about 10 to about 50 pounds of smectite clay is sufficient. The clays treated in accordance with the present invention can be used in lesser amounts than dry-mixed clay/polymer blends to pass ASTM Test #9095. The waste-containing clay then can be physically trapped in a solid matrix, e.g., by mixing the waste-containing clay with portland cement. Typical smectite clay-containing compositions for stabilization of waste sludges containing inorganic and organic waste materials are described in U.S. Pat. Nos. 4,650,590; and 4,149,968; hereby incorporated by reference.

The smectite clays treated in accordance with the present invention are useful in the absorption of water-dissolved contaminants and adsorption of organic wastes that are emulsified in water, for use in sludge solidification and sludge thickening.

5. Flocculation of Impurities From Waste Waters

Smectite clays, particularly sodium bentonite, have a long chain structure that provides sites, via the anionic clay charge, for adherence of inorganic contaminants, or for reaction to form an organoclay for adherence to multiple lipophilic sites, between smectite clay layers. By combining a cationic polymer, e.g., polyacrylamide, with the smectite or organophilic clay, anionic contaminants are attracted to the polymer, and the polymer is attracted to the clay platelets to flocculate the contaminants and clay together for easy removal of the flocs. Examples of such separation of contaminants are found in U.S. Pat. No. 3,487,928; 2,367,384; and 4,517,094, hereby incorporated by reference.

The smectite clays treated in accordance with the present invention also are useful in the flocculation of contaminants and easier separation of the smectite flocs from the liquid.

6. Slurry Trenching

Smectite clays, such as highly water-swellable sodium bentonite clay, also are useful in slurry form (e.g., 1 part by weight clay for every 5 to 50 parts, usually 10 to 30 parts, water) to prevent the side walls of a trench from collapsing during excavation. The bentonite/water slurry is pumped into the trench during excavation and the clay from the slurry deposits on the excavated side walls and bottom wall or floor surfaces of the trench to hold the soil together at the excavated walls. The treated smectite clay of the present invention provides better results in slurry trenching to provide more structurally stable sidewalls when excavation uncovers contaminated water, and provides a surface clay cake on the excavated trench or on other dam walls to provide walls that are impermeable, or less permeable, to contaminated water.

Examples of these technologies and uses for the water-swellable clays rewetted, polymer-impregnated, and redried in accordance with the present invention are disclosed in the following U.S. Patents, all of which are hereby incorporated by reference: Clem U.S. Pat. Nos. 3,186,896; Clem 4,048,373; Clem 4,021,402; Clem 4,084,382; Clem 4,087,365; Clem 4,279,547; McGroarty 4,316,833; Piepho 4,332,693 and 4,462,470; Blais 4,344,722; Kingsbury 4,439,062; Harriett 4,534,925; Harriett 4,534,926; Alexander 4,634,538; Harriett 4,668,724; Harriett 4,696,698; Harriett 4,696,699; Alexander 4,886,550; Alexander 4,836,940; Harriett 4,733,989; Alexander 4,832,793; Harriett 4,810,573; Alexander 4,847,226; Colangelo 4,936,386 and 4,919,989; Alexander, et al. 4,919,818 and 4,944,634 and Alexander 5,112,665.

Excellent gel strength is achieved when water swellable bentonite, e.g., sodium bentonite, starting clays are processed in accordance with the present invention by combining the clay with a water-soluble polymer, rewetting the clay to solubilize the polymer and to impregnate the clay with the polymer, and then redrying the clay to a water content less than about 12% by weight. After processing by rewetting, polymer impregnating, and redrying, the clays are excellent suspending agents for use in the cosmetics and pharmaceutical industries in amounts well known in the art.

SUMMARY OF THE INVENTION

In brief, the present invention is directed to a method of treating smectite clays, particularly bentonite clays such as sodium bentonite (absorbence) and calcium bentonite (adsorbence) and organophilic smectite clays to increase their contaminated water absorption and contaminant adsorption capabilities. In accordance with the present invention, after the clay has been mined and dried, the clay is mixed with a water-soluble polymer, preferably in a solid, finely divided form, and the mixture of clay and polymer is contacted with water to solubilize the polymer and rewet the clay, without completely hydrating the clay, while impregnating the clay with the solubilized polymer, and then the clay is redried for unexpected improvement of clay properties.

After the common initial drying of the clay to a moisture content of about 12% or less, the clay is mixed with a water-soluble polymer and then rewetted with water to a moisture content of more than 12% by weight, preferably about 15% to about 100% by weight, based on the dry weight of the clay, to impregnate the clay with solubilized polymer, and then the polymer-impregnated clay is redried to a moisture content of about 12% by weight or less, based on the dry weight of the clay. This rewetting with water and dissolved polymer in an amount sufficient to impregnate the clay with at least about 0.5% by weight polymer, based on the dry weight of the clay, preferably about 1% to about 10% by weight polymer, more preferably about 2% to about 5% polymer by weight, and then redrying the polymer-impregnated clay to a moisture content of about 12% by weight water or less, unexpectedly improves the contaminated water absorbency and viscosity properties; unexpectedly increases the rheology properties of the clays for oil well drilling fluids, and lost circulation fluids when contaminated water is encountered in the drill hole; and provides unexpectedly increased contaminated water absorption and retention in forming water-swellable clay-based water barriers, that impede the flow of contaminated water. Smaller amounts of polymer down to about 0.1% by weight, based on the dry weight of the clay, will provide some benefit and amounts greater than about 10%, based on the dry weight of the clay should provide slightly enhanced results but the increased results are not sufficient in comparison to the increased cost of the additional water-soluble polymer.

Accordingly, one aspect of the present invention is to provide a new and improved method of beneficiating the chemical and/or physical properties of smectite clays, particularly calcium bentonite and highly water-swellable clays, e.g., sodium bentonites. The process of the present invention, including the steps of rewetting the clay simultaneously with polymer impregnation, together with redrying, improves the usefulness of the clay in one or more industries that water-swellable clays are used for their gel strength when in contact with contaminated water; suspending properties when in contact with contaminated water; contaminated water-absorbing ability when in contact with contaminated water; ability to remove contaminants from a contaminated water by adsorption and/or flocculation; ability to solidify or thicken contaminated water; or ability to increase the viscosity of contaminated aqueous liquids.

Another aspect of the present invention is to provide a new and improved method of treating smectite clays, particularly calcium bentonite and highly water-swellable clays, e.g., sodium bentonites, by initially drying the clay to a moisture content of about 12% by weight or less; homogeneously mixing the dried clay with a water-soluble polymer; rewetting the dried clay with water to a moisture content of more than about 12% by weight, preferably at least about 15% by weight, particularly about 15% to about 35% by weight, or up to about 100% by weight when using a double hydration method, simultaneously with impregnating the clay with solubilized polymer; and then redrying the polymer-impregnated clay to a moisture content of about 12% by weight or less, based on the dry weight of the clay, preferably prior to contacting the clay with contaminated water.

Another aspect of the present invention is to provide a new and improved method of treating smectite clays, particularly calcium bentonite and highly water-swellable clays, e.g., sodium bentonites, to maintain their effectiveness as a barrier to the flow of various liquids, such as organic liquids, and particularly, contaminated water. The method includes initially drying the clay to a moisture content of about 12% by weight or less; homogeneously mixing the dried clay with a water-soluble polymer; rewetting the clay with water to a moisture content of more than about 12% by weight, preferably at least about 15% by weight, to impregnate the clay with solubilized polymer; and then redrying the polymer-impregnated clay to a moisture content of about 12% by weight or less, based on the dry weight of the clay.

Another aspect of the present invention is to provide a new and improved method of treating smectite clays, particularly calcium bentonite and highly water-swellable clays, e.g., sodium bentonites, that have been dried to a moisture content of about 12% by weight or less, to maintain their effectiveness when in contact with contaminated water and, after the clay has been initially dried to a moisture content of about 12% by weight or less, the clay is processed by homogeneously blending the dried clay with a water-soluble polymer; rewetting the clay with water to a moisture content of more than about 12% by weight, preferably at least about 15% by weight, simultaneously with impregnating the clay with solubilized polymer; and then redrying the clay to a moisture content of about 12% by weight or less, to improve the gel strength of the clay when in contact with contaminated water.

Still another aspect of the present invention is to provide a new and improved method of treating smectite clays, particularly calcium bentonite and highly water-swellable clays, e.g., sodium bentonites, that have been dried to a moisture content of about 12% by weight or less; homogeneously mixing the dried clay with a water-soluble polymer; rewetting the clay with water to a moisture content of more than about 12% by weight, preferably at least about 15% by weight, to impregnate the clay with solubilized polymer; and then redrying the polymer-impregnated clay to a moisture content of about 12% by weight or less, to improve the capacity of the clay to suspend and/or flocculate solids or immiscible liquids in dissolved contaminant containing aqueous dispersions.

Another aspect of the present invention is to provide a new and improved method of treating smectite clays, particularly calcium bentonite and highly water-swellable clays, e.g., sodium bentonites, that have been dried to a moisture content of about 12% by weight or less, to maintain the effectiveness of the water-swellable clay in contaminated water, by homogeneously mixing the dried clay with a water-soluble polymer; rewetting the clay with water to a moisture content of more than about 12% by weight, preferably at least about 15% by weight, to impregnate the clay with solubilized polymer; and then redrying the polymer-impregnated clay to a moisture content of about 12% by weight or less, to improve the contaminated water-absorbing capacity of the clay.

Another aspect of the present invention is to provide a new and improved method of treating smectite clays, particularly calcium bentonite and highly water-swellable clays, e.g., sodium bentonites, by homogeneously mixing the dried clay with a water-soluble polymer; rewetting the clay with water to a moisture content of more than about 12% by weight, preferably at least about 15% by weight, to impregnate the clay with solubilized polymer; and then redrying the polymer-impregnated clay to a moisture content of about 12% by weight or less, to increase the capacity of the clay to increase the viscosity of dissolved contaminant-containing aqueous liquids.

Another aspect of the present invention is to provide a new and improved method of treating smectite clays, particularly calcium bentonite and highly water-swellable clays, e.g., sodium bentonites, that have been dried to a moisture content of about 12% by weight or less, to maintain the effectiveness of the clay during drilling into an earthen formation containing contaminated water, by homogeneously mixing the dried clay with a water-soluble polymer; rewetting the clay with water to a moisture content of more than about 12% by weight, preferably at least about 15% by weight, to impregnate the clay with solubilized polymer; and then redrying the polymer-impregnated clay to a moisture content of about 12% by weight or less, to increase the gel strength of an aqueous, contaminated, aqueous drilling mud containing the treated clay.

Still another aspect of the present invention is to provide a new and improved method of treating smectite clays, particularly calcium bentonite and highly water-swellable clays, e.g., sodium bentonites, that have been dried to a moisture content of about 12% by weight or less, to maintain the effectiveness of the clay during drilling into an earthen formation containing contaminated water, by homogeneously mixing the dried clay with a water-soluble polymer; rewetting the clay with water to a moisture content of more than about 12% by weight, preferably at lest about 15% by weight, to impregnate the clay with solubilized polymer; and then redrying the polymer-impregnated clay to a moisture content of about 12% by weight or less, to increase the capacity of the clay, in a contaminated aqueous suspension, to plug cracks and interstices in a well to minimize loss of a drilling fluid.

The above and other aspects and advantages of the present invention will become more apparent when considered together with the following detailed description of the preferred embodiments, which is made with reference to the drawings, a brief description of which is provided below.

DETAILED DESCRIPTION OF THE PREFERRED EMBODIMENTS

Figure 1:
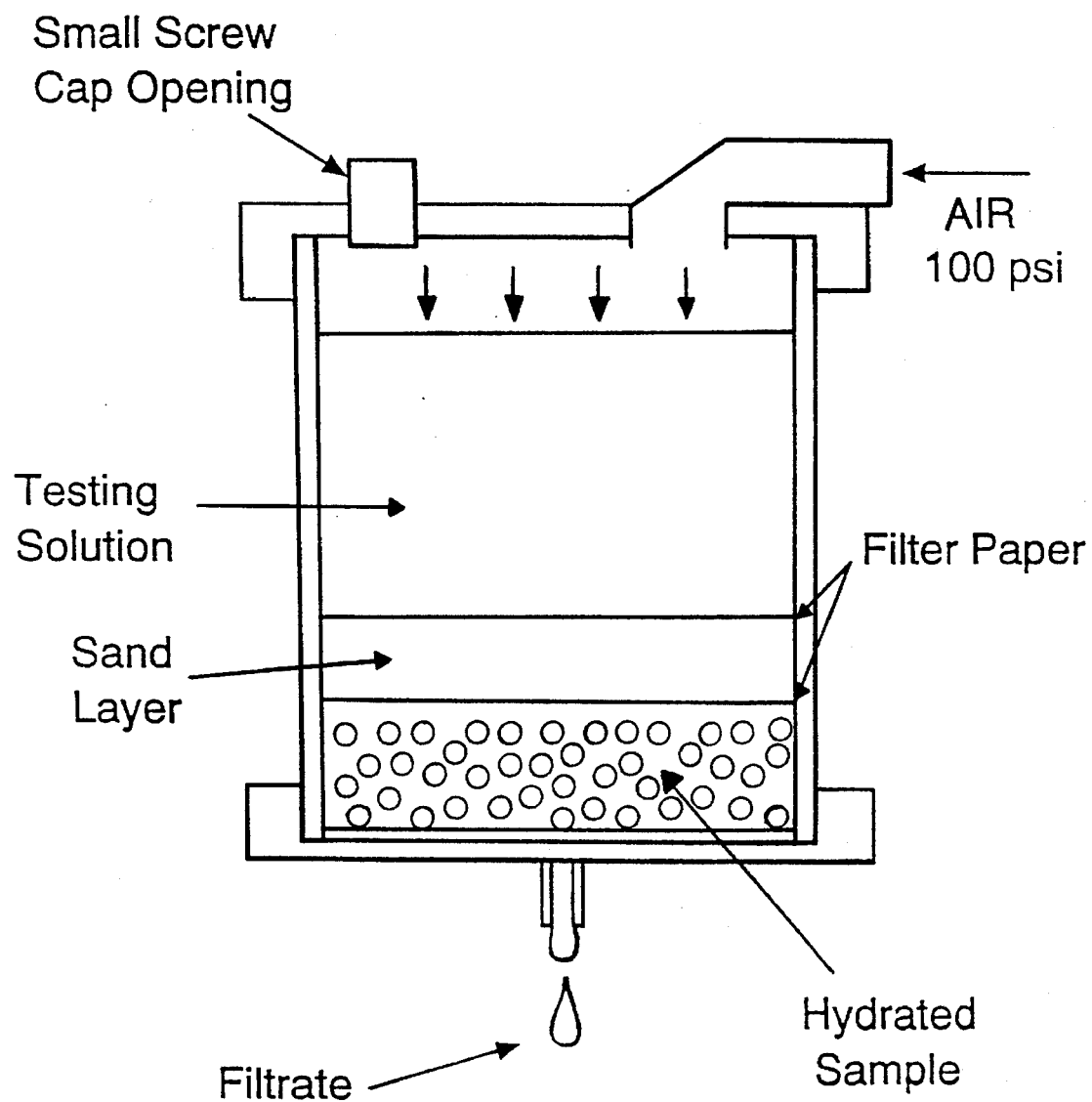
FIG. 1 is a schematic diagram of a top loading fluid loss cell (LSK method) used to measure the absorbency of the polymer-impregnated, redried bentonite clay to absorb contaminated water and for comparison testing of the processed bentonite clays.
Figure 2:
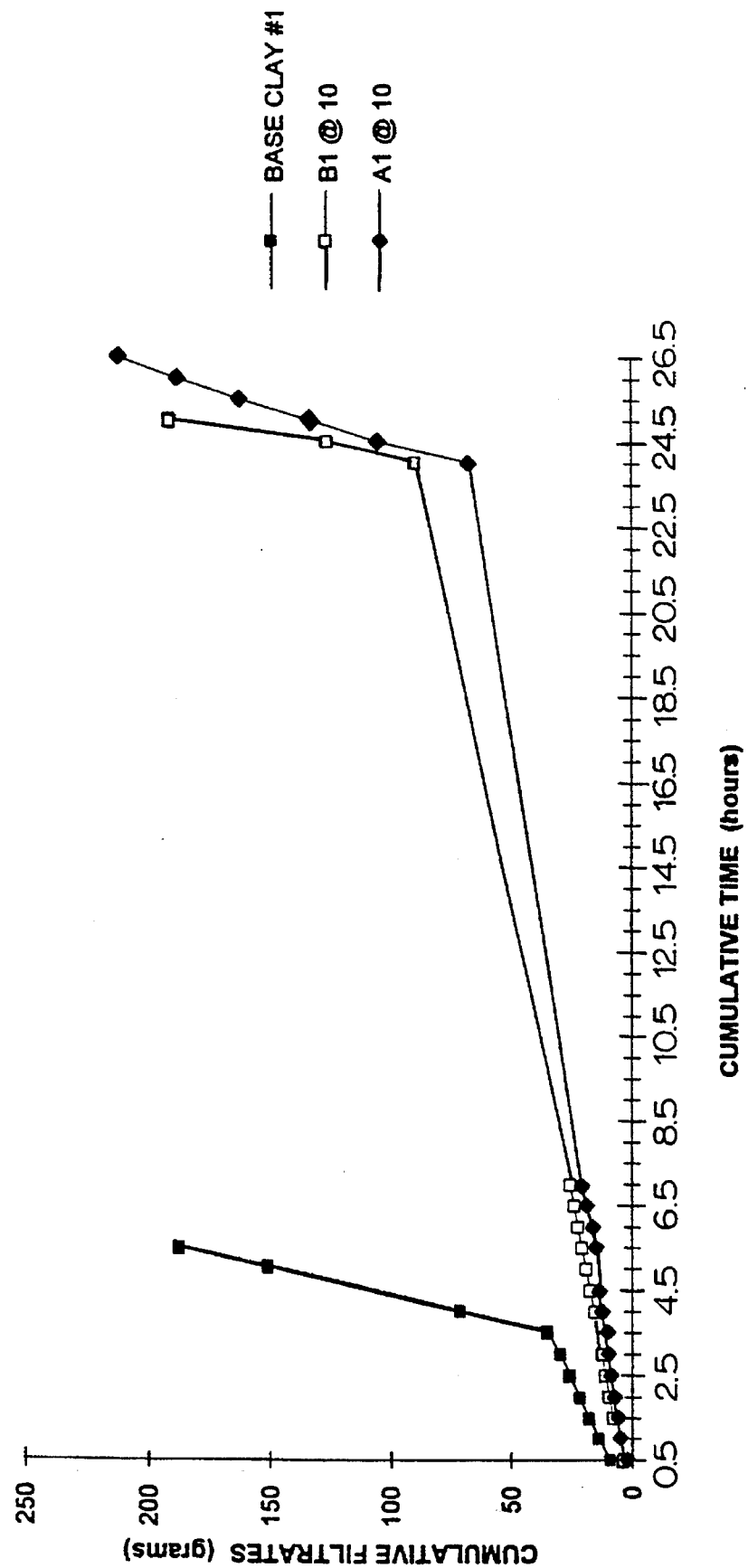
FIG. 2 is a graph showing fluid loss of two rehydrated, polymer-impregnated, redried bentonite clays (B1@10 and A1@10) versus once dried crude bentonite using aqueous 1% $CaCl_2$ as the contaminated water test solution.
Figure 3:
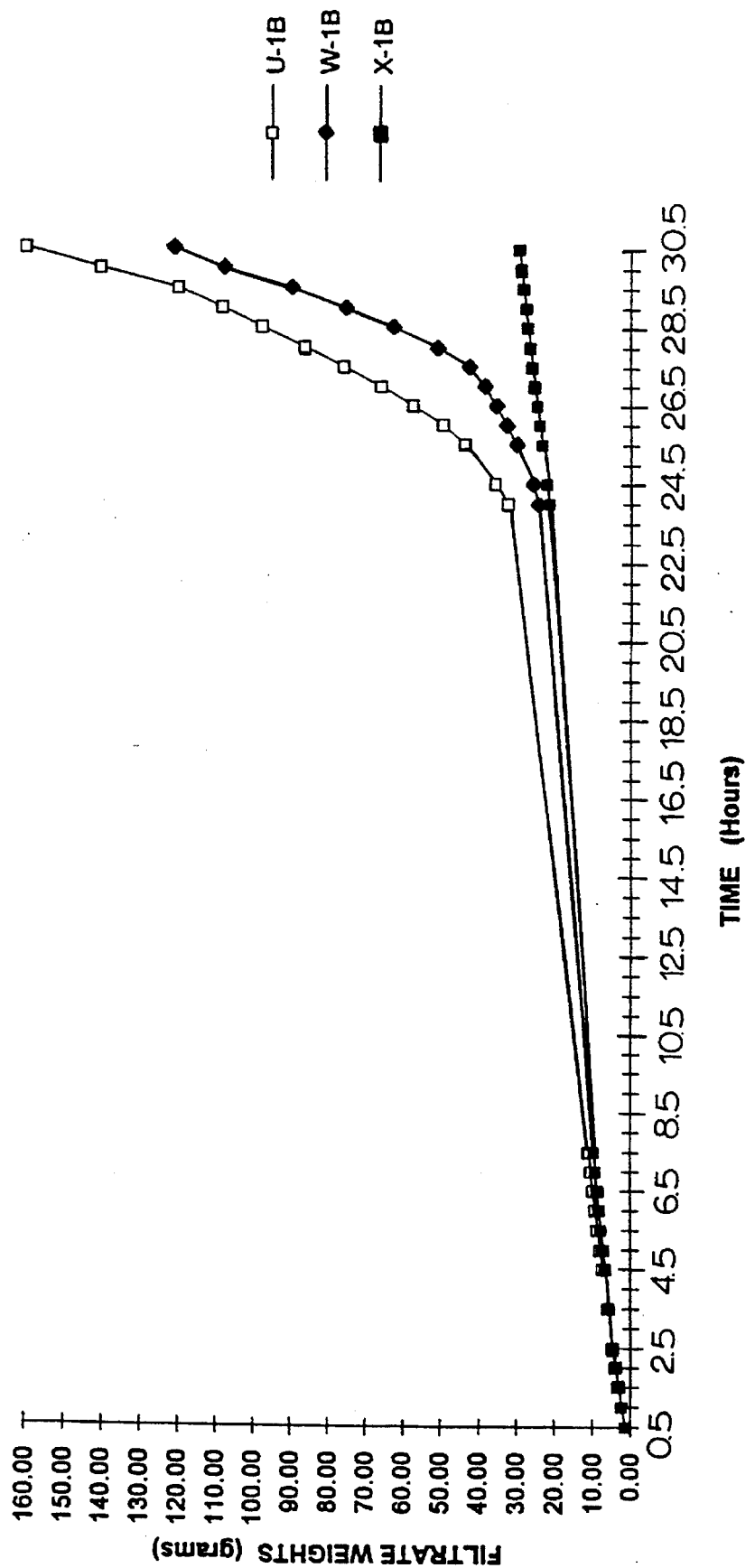
FIGS. 3–5 are graphs each showing fluid loss of three other rehydrated, polymer-impregnated bentonite clays using aqueous 1% $CaCl_2$ solutions as the contaminated water test solutions.
Figure 4:
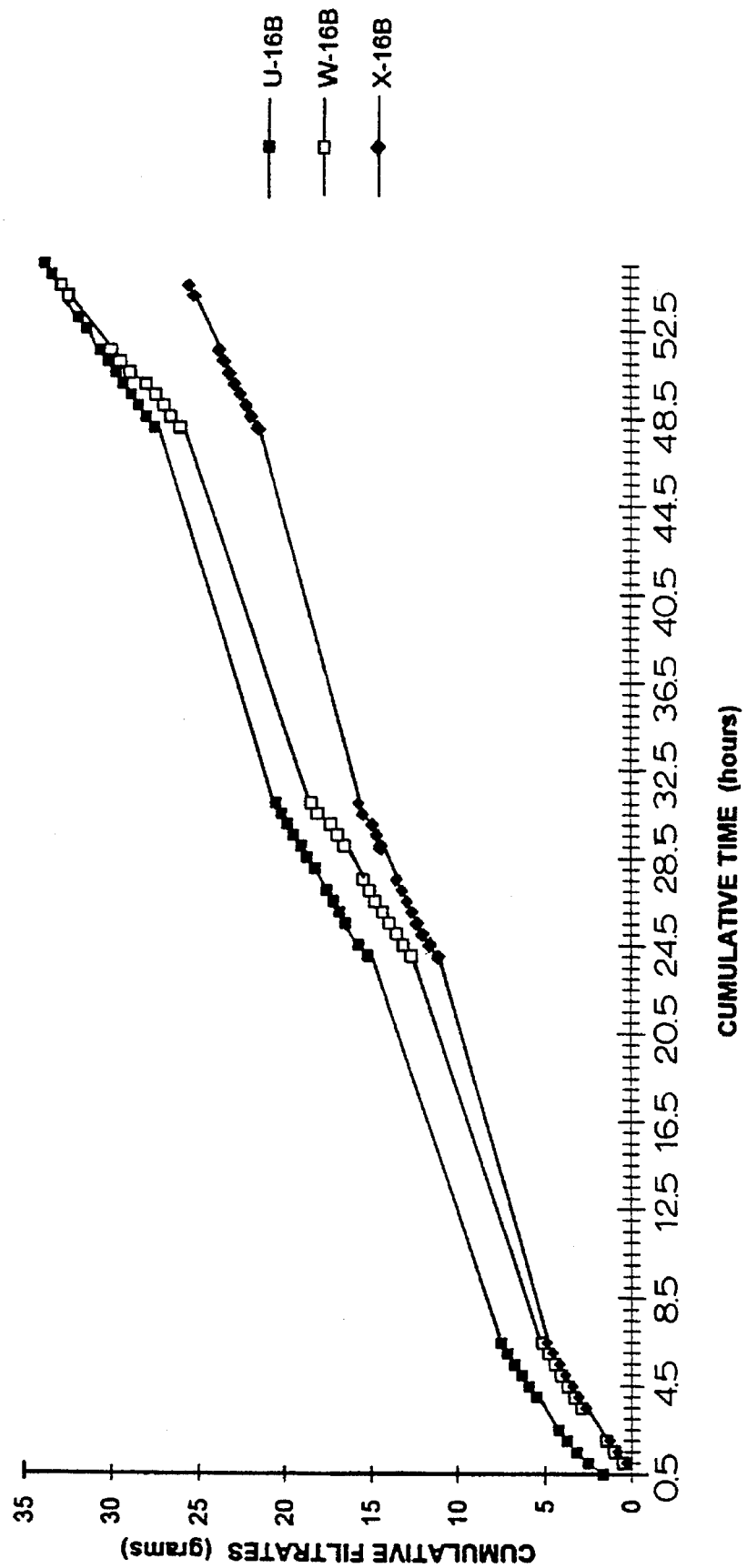
Figure 5:
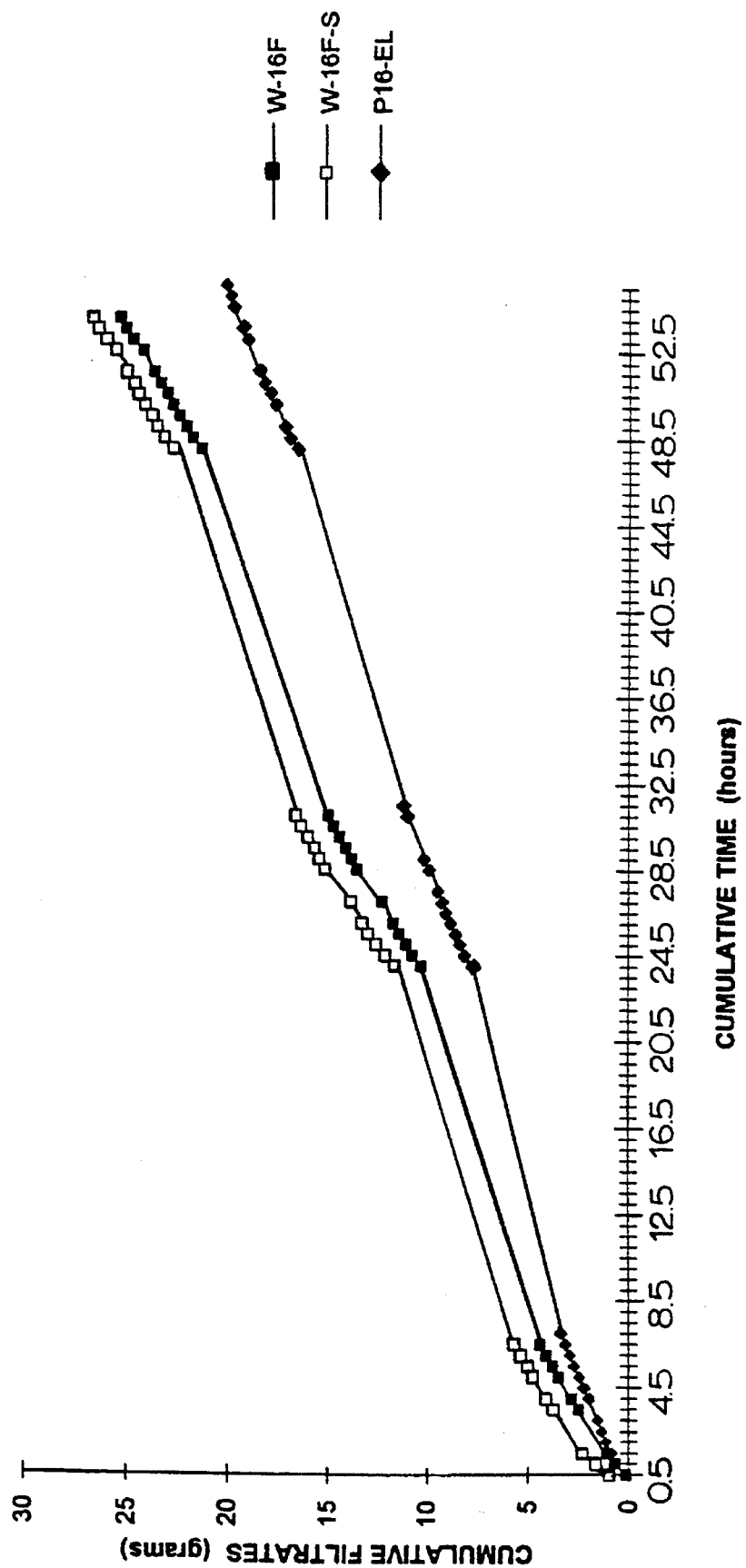

The present invention is directed to a method of treating smectite clays, particularly highly water-swellable clays, e.g., sodium bentonite; and calcium bentonite, to maintain their water-absorbing, water-adsorbing (together referred to as "sorbing"), suspending, flocculating, viscosity raising and/or water-swelling properties when in contact with contaminated water. After the mined clay is initially dried to a moisture content of about 12% by weight or less, the clay is processed by homogeneously mixing the dried clay with a water-soluble polymer; rewetting the clay with water to impregnate the clay with the dissolved polymer solution and then redrying the thus polymer-impregnated water-swellable colloidal clay to a moisture content below about 12% by weight, dry clay basis.

The method of the present invention very simply and unexpectedly maintains the water absorption and water-swellability or other desirable properties of the smectite clay when contacted with contaminated water. To achieve the full advantage of the present invention, the dried clay (12% by weight water, or less) and polymer mixture is rewetted with sufficient water to uniformly impregnate the initially dried quantity of clay being treated with dissolved polymer, without completely hydrating the clay; e.g., at least about 15% to about 100% water, based on the dry weight of the clay.

The smectite clay starting material, such as calcium bentonite or highly water-swellable sodium bentonite, is obtained for use in the aforementioned industries by mining the clay, in a wet condition, generally having about 20% to about 35% by weight water, based on the dry weight of the clay, and then drying the clay to a suitable moisture content, e.g., about 5% to about 10% based on the dry weight of the clay, so that the clay is suitable for grinding to a desired particle size distribution.

Unexpectedly, and surprisingly, it has been found that if the smectite clay is mined and dried and the clay is then homogeneously mixed with a water-soluble polymer and then rewetted sufficiently for dissolved polymer-impregnation, without completely hydrating the clay, e.g., by contacting the clay/polymer mixture with water, to a moisture content of more than about 12% by weight, preferably about 15% to about 100% by weight water, based on the dry weight of the clay, and more preferably to about 18% to about 35% water, based on the dry weight of the clay, and then the polymer-impregnated clay is redried down to a moisture content of about 12% by weight or less, preferably about 5% to about 8% or about 10% water, based on the dry weight of the clay, the thus processed clay has improved properties of: maintaining viscosity in contaminant-containing water; absorbency of contaminated water; adsorbing contaminants from contaminated water; capacity to disperse solids and water-insoluble materials in dissolved contaminant-containing aqueous suspensions; and capacity to flocculate suspended solids from contaminated-containing water.

The preferred smectite clays that are useful as starting materials in accordance with the present invention are non-blue bentonites (blue bentonites are green to greenish yellow to yellow to cream colored sodium bentonites) that have industrially acceptable water swellability and colloidal properties, such as those bentonites having a $Fe^{+3}/Fe^{+2}$ ratio greater than 1, and preferably at least 3 and most preferably in the range of about 5 to about 15. Such clays, including any smectite clay which will hydrate in the presence of water, i.e., will absorb water, e.g., calcium bentonite, and particularly the sodium smectites that are highly water-swellable in the presence of water, are substantially improved for use in contact with containing water in accordance with the method of the present invention. It should be understood, however, that the process of the present invention also improves the properties of blue bentonites having a $Fe^{+3}/Fe^{+2}$ ratio of 1 or less.

In accordance with one important embodiment of the present invention, the smectite clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations, such as calcium, magnesium and iron.

There are cases wherein a montmorillonite predominant in calcium ions can be converted to a high swelling sodium variety through a well-known process called "peptizing". The colloidal clay starting material utilized in this invention may be one or more peptized bentonites. The colloidal clay starting material may also be any member of the dioctahedral or trioctahedral smectite group or mixtures thereof. Examples are Beidellite, Nontronite, Hectorite, Sepiolite and Samonite. To achieve the full advantage of the present invention, the colloidal clay, i.e., bentonite, generally is finely divided or ground as known for use in water barrier panels and the like, i.e., 4 to 350 mesh, preferably 20 to 50 mesh, either prior to polymer mixing and rewetting to impregnate the clay with dissolved polymer, or after rewetting and drying the polymer-impregnated clay.

The crude, mined smectite clay can be dried in any manner that is known in the art to achieve a clay in a condition capable of being ground to a desired particle size distribution. Grinding can be performed in accordance with the present invention prior to or after mixing the clay with a water-soluble polymer and then rewetting the clay to impregnate it with dissolved polymer and redrying the polymer-impregnated clay, to achieve the same beneficial results.

In accordance with the preferred embodiment of the present invention, the mined and dried clay is homogeneously mixed with particles of a water-soluble polymer, and the clay and polymer are then intimately mixed with water to dissolve the polymer and impregnate the clay with water and dissolved polymer. It should be understood, however, that the water-soluble polymer can be dissolved in water to form a solution of polymer that is subsequently used to impregnate and rewet the clay. However, while it is possible to hydrate a clay with a solution of water and water-soluble polymer, there are some disadvantages or inconveniences with this method. If more water is used in the rewetting and polymer-impregnating step, more water must be driven off in the redrying step. Advantageously, a relatively small quantity of water is used to re-hydrate the clay and to impregnate the clay with dissolved polymer. Just enough water to effectively rewet the clay is insufficient to totally dissolve the polymer, producing a lumpy solution. By first mixing the polymer with the clay, together with any optional additives, such as a dispensing agent, e.g., SAPP, water can be easily sprayed or poured into the clay mixture. Also dry clay and chemical additives are easier to measure and mix than polymer and water. With this method, there would not be problems with thick, sticky, lumpy polymer clogging up the sprayers or water applicators. Because the dry clay, polymer, and any optional chemical additives would already be premeasured and premixed, adding too much or too little water would not result in either over or under polymer treatment. Adding water to an already prepared mixture of dry clay, polymer, and any optional chemical additives would be more efficient for plant operation.

In accordance with the preferred embodiment, the clay is rewetted and the polymer dissolved using non-contaminated water, to a water content of at least about 15%, based on the dry weight of the clay, and the polymer-impregnated clay is then redried to a water content of about 12% or less, based on the dry weight of the clay, prior to or after grinding. The improvement in clay properties for use in contact with contaminated water is achieved in accordance with the present invention regardless of the method used for wetting, polymer impregnation, drying, and grinding the clay so long as the dried water-swellable clay, having a moisture content of about 12% or less, is rewetted and impregnated with dissolved polymer in an amount sufficient to impregnate the clay with at least about 1% by weight polymer, based on the dry weight of the clay, and sufficient water to rehydrate the clay to a water content of more than about 12% by weight, preferably at least about 15% by weight, based on the dry weight of the clay. More preferably, the clay is rewetted to a water content of at least about 18%, up to about 100% by weight, based on the dry weight of the clay, and thereafter redried to a water content of about 12% or less, based on the dry weight of the clay.

For most industrial uses of the clays treated in accordance with the present invention, it is preferred that a dispersing agent is included with the water-soluble polymer to achieve more even and homogeneous impregnation of the polymer, upon solubilization, into the entire mass of the smectite clay being treated. While the dispersing agent is not essential to achieve the advantages of the present invention, and is particularly disadvantageous in the sludge solidification, sludge thickening, and contaminant flocculation industrial uses, a dispersant/thinning agent improves consistency in results in the water-absorbency, contaminant adsorbing, and solids dispersing industrial uses by more evenly distributing the dissolved polymer throughout all of the clay and aiding to thin the dissolved polymer/water solution for better impregnation of the clay. The preferred dispersing/thinning agent is sodium acid pyrophosphate (SAPP). Other suitable dispersing agents include tetra sodium pyrophosphate; sodium meta phosphate; sodium tetra phosphate; tannic acid; sodium tannate; soda ash; caustic soda; calcium lignosulfonate; mined lignins and modified chrome lignosulfonates.

The preferred rehydration methods are outlined as follows:

Single Rehydration Polymer Treat Method (1) Start with a dried crude untreated bentonite base clay.

(2) Reduce this base clay to a powder by grinding it to pass 0.5 mm grinder mesh screen.

(3) Weigh out a portion of this powdered base clay.

(4) To the weighed powdered clay, add the proper amounts of polymer and SAPP[1]. Depending on the application of the resultant clay, SAPP

[1] Sodium acid pyrophosphate. may be deleted, changed to another dispersant, or another chemical additive (with a different purpose) may be substituted.

(5) Place the powdered clay mixture into a Kitchen Aid Mixer bowl. (At the plant, a "Pug Mill" would be used for the mixing.)

(6) Place the mixing bowl into the Kitchen Aid mixer and install the "beater" mixing attachment.

(7) Start the rotary mixing on the lowest setting.

(8) While rotary mixing (still on the lowest speed), slowly add enough water to bring the moisture of the mixture up to about 35%[2]. (Prior to this step, the moisture content of the clay had to have been determined in order to calculate the amount of water needed.)

[2] The amount of water used for the most effective rehydration will vary with the water-absorption properties of the base clay. Less water-absorbent clays, e.g., calcium bentonite, should be wetted with more water, e.g., 40–60% $H_2O$ for best polymer impregnation.

(9) After the measured water has been added, keep mixing (still on lowest speed for a minimum of 5 minutes. If mixture is still not consistent, continue mixing. (At the plant, the mixing should be continued until the mixture is evenly wetted and consistent.)

(10) After mixing, transfer the wetted mixture into a closed container or a plastic bag. (At the plant, a tarp or plastic sheet could be used to cover the mixture.)

(11) Allow mixture to hydrate for minimum of two days.[3]

[3] Aging is not essential, particularly if the mixture is extruded and pug milled, as at a commercial plant.

(12) Dry the clay mixture to 7–10% moisture content.

(13) Granulate the mixture.

Double Rehydration Polymer Teat Method (1) Weigh out a portion of dried crude bentonite clay.

(2) Add the proper amounts of polymer to the weighed clay.

(3) Add water to the clay-polymer mixture equivalent to about 75%–100% of the clay weight. (If the clay weight is 1000 grams, then add 1000 grams or mls of water.) Stir the mixture while adding the water to ensure even distribution of the water.

(4) Cover the wetted mixture or transfer into a sealed container or plastic bag.

(5) Allow wetted clay mixture to hydrate for minimum of two days.

(6) Dry the clay mixture to about 7% moisture content.

(7) Add to the dried clay mixture the same amount of water as used in the first rehydration. Do not add any more polymer in this step.

(8) Allow the clay mixture to hydrate for minimum of two days.

(9) Dry the clay mixture to 7–10% moisture content.

(10) To the granulated sample, add 10 pounds per ton of SAPP and an additional 5 lb./ton of polymer. Depending on the application of the resultant clay, SAPP may be deleted, changed to another dispersant, or another chemical additive (with a different purpose) may be substituted.

(11) Mix sample completely.

The Kitchen Aid mixer was used because it simulates the mixing action of a Pug Mill at the plant. With the single rehydration technique, the untreated base clay should be in powdered form. Because the least amount of water necessary for polymer impregnation preferably is used to rehydrate the clay, it would be easier for smaller, powdered clay particles to absorb the dissolved polymer during the rehydration stage.

The single rehydration procedure was preformed on sodium bentonite base clays using ALCOMER 228 polymer and SAPP. Fluid loss tests were run on this sample (W-16F) using both deionized (DI) water and 1000 ppm $CaCl_2$. The results showed not only low filtrate values, but virtually no difference between the DI water filtrates and the calcium-contaminated water filtrates. The values for this sample were relatively low and showed that the calcium contamination did not appear to really effect the fluid loss characteristics of the sample.

With respect to the particle size distribution of the final product, each of the lab rehydrated samples were made to have the same distribution. In the past, it has been found that the presence of fines (anything passing U.S. Sieve No. 60) was beneficial to both fluid loss and sealant properties. The particle size distribution of the lab-prepared samples were patterned after commercial products as follows:

TABLE 1

Particle Size Distribution of Lab Prepared Samples WITH Fines (Percent Retained on U.S.A. Standard Sieve, ASTM Spec E-11 and I.S.O.)

| Sieve No. | % Retained (by weight) |
| --- | --- |
| 20 | 6 |
| 30 | 17 |
| 40 | 17 |
| 50 | 16 |
| 60 | 8 |
| 100 | 17 |
| 200 | 10 |
| Pan | 9 |
| Total | 100% |

Two samples of clay were rehydrated simultaneously with polymer-impregnation and redried using the above-described rehydration method on sodium bentonite clay and a combination of ALCOMER 228 polymer and SAPP. One sample was ground to include fines, as shown in Table 1 and one sample was ground to essentially exclude fines (less than 5% passing 60 mesh), as shown in Table 2.

TABLE 2

Particle Size Distribution of Lab Prepared Samples with NO Fines (Percent Retained on U.S.A. Standard Sieve, ASTM Spec E-11 and I.S.O.)

| Sieve No. | % Retained (by weight) |
| --- | --- |
| 20 | 20.7 |
| 30 | 48.8 |
| 40 | 22.6 |
| 50 | 3.9 |
| 60 | 0.8 |
| 100 | 1.0 |
| 200 | 0.7 |
| Pan | 1.5 |
| Total | 100% |

Fluid loss testing of the processed clays of Tables 1 and 2 show no real differences between the sample with fines versus the sample essentially without fines.

A reason for this unexpected characteristic (no difference between samples with or without fines), is that each of the particles in the resultant product (fine or coarse) is more uniformly treated, but the internal clay platelets may also tend to be more uniformly aligned. Therefore, the sample would tend to hydrate and disperse more evenly regardless of particle size distribution.

To illustrate the substantial and unexpected increase in the properties of a water-swellable clay, for absorption and swelling when in contact with contaminated water, when mixed with water-soluble polymer and then rewetted with water to solubilize the polymer to impregnate the clay with the water solution containing dissolved polymer, and then the polymer-impregnated clay is redried in accordance with the present invention, crude sodium bentonite clays were tested in comparative fluid loss tests, using top loading cells 10, as shown in FIG. 1, to measure the effects of the rehydration and polymer impregnation process of the present invention. The fluid loss test was chosen to produce the results that best relate to sealant properties.

The test (hereinafter called the LSK method) is an accelerated procedure to test a sample when contacted with testing solutions containing one or more contaminants for measuring the effects of these solutions upon the sealant characteristics of the sample. This test differs from the API Fluid Loss test in that the API method tests mixed slurries. By mixing a clay sample into a slurry, the clay and chemical additives (if any) have the advantage of dispersing and hydrating more efficiently. In some of the real field applications of sealant bentonite products (such as BENTOMAT® and VOLCLAY® Panels), the bentonite clay does not have the benefit of being mixed prior to its application onto the job site. The product has to hydrate on its own and in the position (and in the form) where it is laid and used. In addition, the purpose of the API Fluid Loss test is to measure how much existing fluid a slurried sample will lose—not how much additional external fluid will pass through it. The cells used for the API Fann apparatus are not appropriate for adding testing solutions on top of existing slurries or slurry cakes.

With the Top Loading Filter Press Test, the sample is allowed to hydrate (with whatever prehydration liquid desired) on its own as it would in actual use. After hydration, various testing solutions (contaminated or pure DI water) can be poured on top of the hydrated "cakes" to simulate the exposure of a sample to external fluids. This test differs from Rigid Wall and Triaxial Permeameter Tests in that the testing solutions (or permeants) in this test are forced through the samples by using 100 psi of compressed air. Because the testing solutions are forced through the sample much quicker than in the other permeameter cells, any changes in the sealant characteristics (due to the test solutions) can be observed much sooner than in the other permeability tests. Because the Top Loading Filter Press Test measures the amount of fluid passing through it, lower filtrate values are preferred. If a sample contacted with a certain testing solution results in degradation, the filtrate values should increase and continue increasing (if the degradation continues).

Although this Top Loading Filter Press test measures how much fluid or testing solution will pass through it, it cannot be equated to a permeability test. Because of the manner in which this test is performed, the filtrate values cannot be substituted into any of the known permeability or "hydraulic conductivity" equations. It is mainly a relative-comparative test to measure the ability of a hydrated sample to prevent certain solutions from passing through it.

APPARATUS and EQUIPMENT

Filter Press, Bench Mount (Oil Field Industries Catalogue #140-20)
Top Cap of cells to have been custom modified with small screw cap opening
Compressed air tank
Filter paper
40–50 grams of dried granular sample
Prehydration solutions
Testing solutions
Luminous dye TOP LOADING FILTER PRESS TEST (LSK Method)

(1) Place about 1 tablespoon of dried granular sample to be tested in a small cup or container. Add enough deionized water to sample and stir to make a paste. Age this paste for at least 1–2 hours.
(2) Apply a layer of the sample paste to the lower inner wall of the cylinder portion of the filter press cell.
(3) Allow the paste layer to dry.
(4) Assemble the top loading filter press cell with the filter paper. Use caution so that the dried inner paste layer is not cracked or damaged while assembling cell.
(5) Weigh out 12.0 grams of dried granular sample.
(6) Sprinkle sample into the cell so that it evenly covers the bottom.
(7) Place another filter paper on top of sample.
(8) Evenly pour 50 grams of sand onto the filter paper.
(9) Place another filter paper on top of sand.
(10) Place cell into the mount and tighten the top cap lid down using the mount.
(11) Using a funnel, carefully pour 60–70 mls of prehydration solution into the cell through the small screw cap opening in the top cap lid.
(12) Allow sample to hydrate for a minimum of 16 hours.
(13) Prepare testing solution.
(14) Add a luminous dye to the testing solution and stir.
(15) Through the small screw cap opening, pour about 200 mls of dyed testing solution onto the hydrated sample (using a funnel).
(16) Seal the top cap lid by tightening the small screw cap onto the opening. Use TEFLON tape around the screw cap to ensure a hermetic seal.
(17) Connect the Filter Press cell to the compressed air tank.
(18) Weigh out the filtrates at regularly timed intervals (e.g., 30 minutes). If a severely contaminated testing solution is used, shorter time intervals may be desired.
(19) Keep test running for 6–7 hours nonstop.
(20) Depending on the purpose and application of the test, if there is still no sign of the dyed testing solution in the filtrates after 6–7 hours (and if the filtrate values are consistently low and steady), lower the pressure to about 60 psi and keep the test running to the next day(s).
(21) Place a large enough container underneath the cell to accommodate the 200 mls of testing solution, should the sample completely fail during the night. Tare this container prior to using.
(22) Cover the entire filter press assembly with a plastic sheet to help prevent any splattering if there should be a break in the seal.
(23) In the morning, weigh the accumulated overnight filtrates and observe any dyed testing solution in the filtrates.

(24) Raise pressure back up to 100 psi and continue to weigh the timed interval filtrates until the desired test termination.

The purpose of lining the lower inside of the cell with paste is to help prevent side-wall leakage in the cell. The reason for allowing the paste to dry is to minimize the dry sample from adhering to the paste layer. (We do not wish to lose any sample to the side walls.) This paste should be made from the sample to be tested—the paste from one sample should not be used for other different samples.

The reason for adding the dye to the testing solution is to see when and if the testing solution completely penetrates the sample layer. The first several sets of filtrates will probably be prehydration solution and will therefore be colorless. When the dye appears, this means that the testing solution has penetrated the sample layer. Therefore, special attention should be directed at the subsequent filtrate weights to observe the penetration of the testing solution through the sample. If the dye appears in the very first filtrates, then either the sample failed immediately when exposed to the testing solution, or there was a break in the sample cake seal. In most of these cases, a leak or break in the sample cake is the cause of the immediate appearance of the dyed testing solution. Another advantage of using dyed testing solution is that it can be used to indicate where in the sample cake did the testing solution completely penetrate. Luminous dye is preferred over other dyes because it will not be absorbed by the clay sample, nor react with it, as well as not interfere with the testing solutions.

The purpose of adding a sand layer on top of the hydrated sample is to prevent the dry sample from being disturbed during the addition of the prehydration solution. This sand layer also helps to keep the hydrated sample cake intact during the addition of the testing solution.

If the purpose of the test is to test the clay sample in contact with a certain testing solution (as it is in most cases) and there is still no sign of the dyed testing solution after the first 6–7 hours, then the test should be kept running overnight. Only if the filtrates are consistently low and stable should the overnight run be attempted. If the filtrates are very high, the sample will probably fail overnight and all testing solution will come out. When this happens, the sample cake will dry out and all of the compressed air from the cylinder tank will completely bleed out. Since there is no one to watch the cells overnight, the pressure is lowered to help prevent seal breakage. The reason why the pressure is not completely released from the cell is to prevent the sample cake from reswelling up, as well as prevent the sample cake from being disturbed by the pressure change.

This LSK test is NOT a permeability test. It is basically an accelerated filter press procedure to test the flow of test solution through a clay sample. The test results may pattern the permeability tests in testing the ability of a sample to prevent a testing solution from passing through it. However, the way the filter press test is prepared and run, the filtrate values cannot be substituted in any of the known permeameter equations for hydraulic conductivity values. The LSK test differs from the Triax and Rigid Wall permeameters, mainly, in that 100 psi of compressed air is used to force the testing solution (or permeant) through the sample cake and therefore accelerate the results.

The dry and rehydrated samples were tested using a number of contaminants and comparing dry clay plus polymer to rehydrated (polymer impregnated and redried) samples in some cases. The results from the testing are shown in Tables 4–6. The following sodium bentonite base clays were used for the testing:

TABLE 3

| SAMPLE NAME | DESCRIPTION |
|---|---|
| B1 @ 10 | Granular dry base clay #1, 10 lb./ton Cypan Polymer, and 10 lb./ton of SAPP. Sieved of fines. |
| A1 @ 10 | Granular dry base clay #4, 10 lb./ton of Cypan polymer, and 10 lb./ton of SAPP. This sample has fines. |
| C1 @ 10 | Granular dry base clay #5, 10 lb./ton of Cypan polymer, and 10 lb./ton of SAPP. |
| D1 @ 10 | Granular dry base clay #3, 10 lb./ton of Cypan, and 10 lb./ton of SAPP. |
| U-1B | Dry base clay #4 rehydrated with 10 lb./ton of Cypan polymer using Double Rehydration method. 10 lb./ton of SAPP and additional 5 lb./ton of Cypan added. |
| W-1B | Dry base clay #5 rehydrated with 10 lb./ton of Cypan polymer using Double Rehydration Method. 10 lb./ton of SAPP and additional 5 lb./ton of Cypan added. |
| X-1B | Dry base clay #3 rehydrated with 10 lb./ton of Cypan polymer using Double Rehydration Method. 10 lb./ton of SAPP and additional 5 lb./ton of Cypan added. |
| A16-25 @ 10 | Granular dry base clay #4, 25 lb./ton of ALCOMER 228 polymer, and 10 lb./ton of SAPP. |
| C16 = 25 @ 10 | Granular dry base clay #5, 25 lb./ton of ALCOMER 228 polymer, and 10 lb./ton of SAPP. |
| D16-25 @ 10 | Granular dry base clay #3, 25 lb./ton of ALCOMER 228 polymer, and 10 lb./ton of SAPP. |
| U-16B | Dry base clay #4 rehydrated with 25 lb./ton of ALCOMER 228 using Double Rehydration Method. 10 lb./ton of SAPP and additional 5 lb./ton of ALCOMER 228 added. |
| W-16B | Dry base clay #5 rehydrated with 25 lb./ton of ALCOMER 228 polymer using Double Rehydration Method. 10 lb./ton of SAPP and additional 5 lb./ton of ALCOMER 228 added. |
| X-16B | Dry base clay #3 rehydrated with 25 lb./ton of ALCOMER 228 polymer using Double Rehydration Method. 10 lb./ton of SAPP and additional 5 lb./ton of ALCOMER 228 added. |
| W-16F | Dry base clay #5 rehydrated with 25 lb./ton of ALCOMER 228 polymer and 10 lb./ton of SAPP using Single Rehydration Method. This sample has fines. |
| W-16F-S | Dry base clay #5 rehydrated with 25 lb./ton of ALCOMER 228 polymer and 10 lb./ton of SAPP using Single Rehydration Method. This sample has NO fines. |
| P16-EL | Plant Production sample using dry powder base clay #5 with 25 lb./ton of ALCOMER 228 and 10 lb./ton of SAPP. Rehydrated up to 25%–34% using Pug Mill and extruder-simulated Single Rehydration Method. |
| A10-10 @ 10 | Granular dry base clay #4 mixed with 10 lb./ton of OFXC 1146 cationic polymer, and 10 lb./ton of SAPP. |
| A20-10 @ 10 | Granular dry base clay #4 mixed with 10 lb./ton of Jaguar 8920 cationic guar, and 10 lb./ton of SAPP. |
| A21-10 @ 10 | Granular dry base clay #4 mixed with 10 lb./ton of Jet Jel nonionic guar, and 10 lb./ton of SAPP. |
| A22-25 @ 10 | Granular dry base clay #4 mixed with 25 lb./ton of Sigma CMC, and 10 lb./ton of SAPP. |
| U-10F | Dry powdered base clay #4 rehydrated with 10 lb./ton of OFXC 1146 and 10 lb./ton of SAPP using Single Rehydration Method. |
| U-20F | Dry powdered base clay #4 rehydrated with 10 lb./ton of Jaguar 8920 and 10 lb./ton of SAPP using Single Rehydration Method. |
| U-21F | Dry powdered base clay #4 rehydrated with 10 lb./ton of Jet Jel and 10 lb./ton of SAPP using Single Rehydration Method. |
| U-22F | Dry powdered base clay #4 rehydrated with |

TABLE 3-continued

| SAMPLE NAME | DESCRIPTION |
|---|---|
| | 25 lb./ton of Sigma CMC and 10 lb./ton of SAPP using Single Rehydration Method. |
| U-23L | Dry granular base clay #4 rehydrated with 53.7 lb./ton of Pluradyne CA 135 and the amount of water equal to the weight of the clay used. |
| U-23M | Dry granular base clay #4 rehydrated with 90.9 lb./ton of Pluradyne CA 135 and the amount of water equal to the weight of the clay used. |

Table 3 lists the various polymer impregnated and redried sodium bentonite samples tested and their formulations. Table 4 shows API Fluid loss results using deionized water, aqueous inorganic salt solutions contaminated with KCl, NaCl or $CaCl_2$, and aqueous compositions containing an organic, $NH_4NO_3$, contaminant as the permeant. Table 8 shows the results with aqueous solutions contaminated with sea water salt, and various organic chemicals, specifically phenol, acetic acid, and acetone. The concentrations of the contaminants are also indicated in these Tables. Even with the organic contaminants shown in Table 8, the fluid loss values are still lower for the rehydrated samples, especially with the ALCOMER 228 polymer impregnation. The weight average molecular weight of the ALCOMER 228 polymer was found to be about 1,383,000.

In the above Table 4, samples of the same clay and kind of polymer, dry-mixed, are comparable to samples of the same clay impregnated with the same type of polymer, prepared according to the present invention, as follows:

| Dry-Mixed | Impregnated |
|---|---|
| A1 @ 10 | U-1B |
| C1 @ 10 | W-1B |
| D1 @ 10 | X-1B |
| A16-25 @ 10 | U-16B |
| C16-25 @ 10 | W-16B |
| | P-16EL |
| D16-25 @ 10 | X-16B |

The amounts of permeant that penetrated these clays, using the fluid loss data of Table 4, are shown in FIGS. 2–6.

The following Table 5 compares the DELTA values or the differences between the DI water API fluid loss values and the 1000 ppm $CaCl_2$ API fluid loss values for the different-base clay-polymer formulations. Table 5 better illustrates the lower DELTA values of the rehydration treatment process. Lower DELTA values show that there is less difference between the DI Water and the 1000 ppm $CaCl_2$ fluid loss values. The significance of lower DELTA values is that the sample is less effected by the calcium chloride contamination. Higher DELTA values indicate that the sample was more effected by the calcium chloride contamination. DELTA values were computed as below:

$$\text{DELTA(mls)} = 1000 \text{ ppm } CaCl_2 \text{ API FL Value} - \text{DI Water API FL Value}$$

TABLE 4

| SAMPLE | FLUID LOSS API (mls) Deionized Water | FLUID LOSS API (mls) 1000 ppm $CaCl_2$ | FLUID LOSS API (mls) 1000 ppm $NH_4NO_3$ | FLUID LOSS API (mls) 1000 ppm KCl | FLUID LOSS API (mls) 1000 ppm NaCl |
|---|---|---|---|---|---|
| B1 @ 10 | 11.6 | 21.2 | 13.0 | 14.4 | 13.5 |
| A1 @ 10 | 10.7 | 16.5 | 13.8 | 14.0 | 14.2 |
| C1 @ 10 | 9.9 | 15.5 | — | — | — |
| D1 @ 10 | 8.8 | 12.5 | — | — | — |
| U-1B | 8.6 | 11.9 | 9.4 | 11.8 | 9.9 |
| W-1B | 8.6 | 10.3 | 8.6 | 10.2 | 8.7 |
| X-1B | 7.6 | 9.2 | 8.0 | 8.9 | 7.9 |
| A16-25 @ 10 | 9.4 | 10.2 | — | — | — |
| C16-25 @ 10 | 9.0 | 10.0 | — | — | — |
| D16-25 @ 10 | 7.5 | 8.5 | — | — | — |
| U-16B | 8.2 | 8.4 | 8.4 | 8.7 | 8.4 |
| W-16B | 7.7 | 7.8 | 7.8 | 8.2 | 7.8 |
| X-16B | 6.8 | 7.5 | 7.1 | 7.7 | 7.0 |
| W-16F | 8.2 | 8.2 | 8.3 | 8.5 | 8.4 |
| W-16F-S | 8.2 | 8.3 | — | 8.6 | 8.1 |
| P16-EL | 8.3 | 7.5 | 7.8 | 7.9 | 7.6 |
| C19-10 @ 10 | 11.6 | 17.1 | — | — | — |
| A3-10 @ 10 | 12.5 | 17.1 | — | — | — |
| A8-25 @ 10 | 10.5 | 10.3 | — | — | — |
| W-19F | 9.8 | 13.0 | — | — | — |
| U-3F | 11.0 | 13.5 | — | — | — |
| U-8F | 9.5 | 9.2 | — | — | — |

TABLE 5

Comparative DELTA Values between DI Water API Fluid Losses and 1000 ppm $CaCl_2$ API Fluid Losses

| Base Clay/Polymer/SAPP Combination | DELTA (mls) "Dry-Mixed" | DELTA (mls) Rehydrated |
|---|---|---|
| Base clay #4, 10 lb./ton Cypan Polymer 10 lb./ton SAPP | A1 @ 10 5.8 | U-1B 3.3 |

TABLE 5-continued

Comparative DELTA Values between DI Water API Fluid Losses and 1000 ppm $CaCl_2$ API Fluid Losses

| Base Clay/Polymer/SAPP Combination | DELTA (mls) "Dry-Mixed" | DELTA (mls) Rehydrated |
|---|---|---|
| Base clay #5, 10 lb./ton Cypan Polymer, 10 lb./ton SAPP | C1 @ 10 5.6 | W-1B 1.7 |
| Base clay #3, 10 lb./ton Cypan Polymer, 10 lb./ton SAPP | D1 @ 10 3.7 | X-1B 1.7 |
| Base clay #4, 25 lb./ton ALCOMER 228 Polymer, 10 lb./ton SAPP | A16-25 @ 10 0.8 | U-16B 0.2 |
| Base clay #5, 25 lb./ton ALCOMER 228 Polymer, 10 lb./ton SAPP | C16-25 @ 10 1.0 | W-16B 0.1 |
| Base clay #3, 25 lb./ton ALCOMER 228 Polymer, 10 lb./ton SAPP | D16-25 @ 10 1.0 | X-16B 0.7 |
| Base clay #5, 25 lb./ton ALCOMER 228 Polymer 10 lb./ton SAPP | C16-25 @ 10 1.0 | P16-EL −0.8 |

It should be noted that rehydrated samples U-1B, W-1B, X-1B, U-16B, W-16B, and X-16B were prepared in an attempt to provide both the "Dry-Mixed" and Rehydrated samples with the same amount of polymer. In the double rehydration preparation procedure, however, after water addition to the dry clay/polymer blend, and after the first redrying step, it was noted that some of the dissolved polymer, upon drying, was crystallizing on the sides of a drying pan. Accordingly, additional polymer was added to the second rehydration step in an attempt to compensate for the polymer that did not impregnate the clay, but was left stuck to the drying pan. The results, however, are valid, particularly in view of similar results, to follow, using the single rehydration method without adding more polymer to compensate for nonimpregnated (pan crystallized) polymer.

Figure 7:
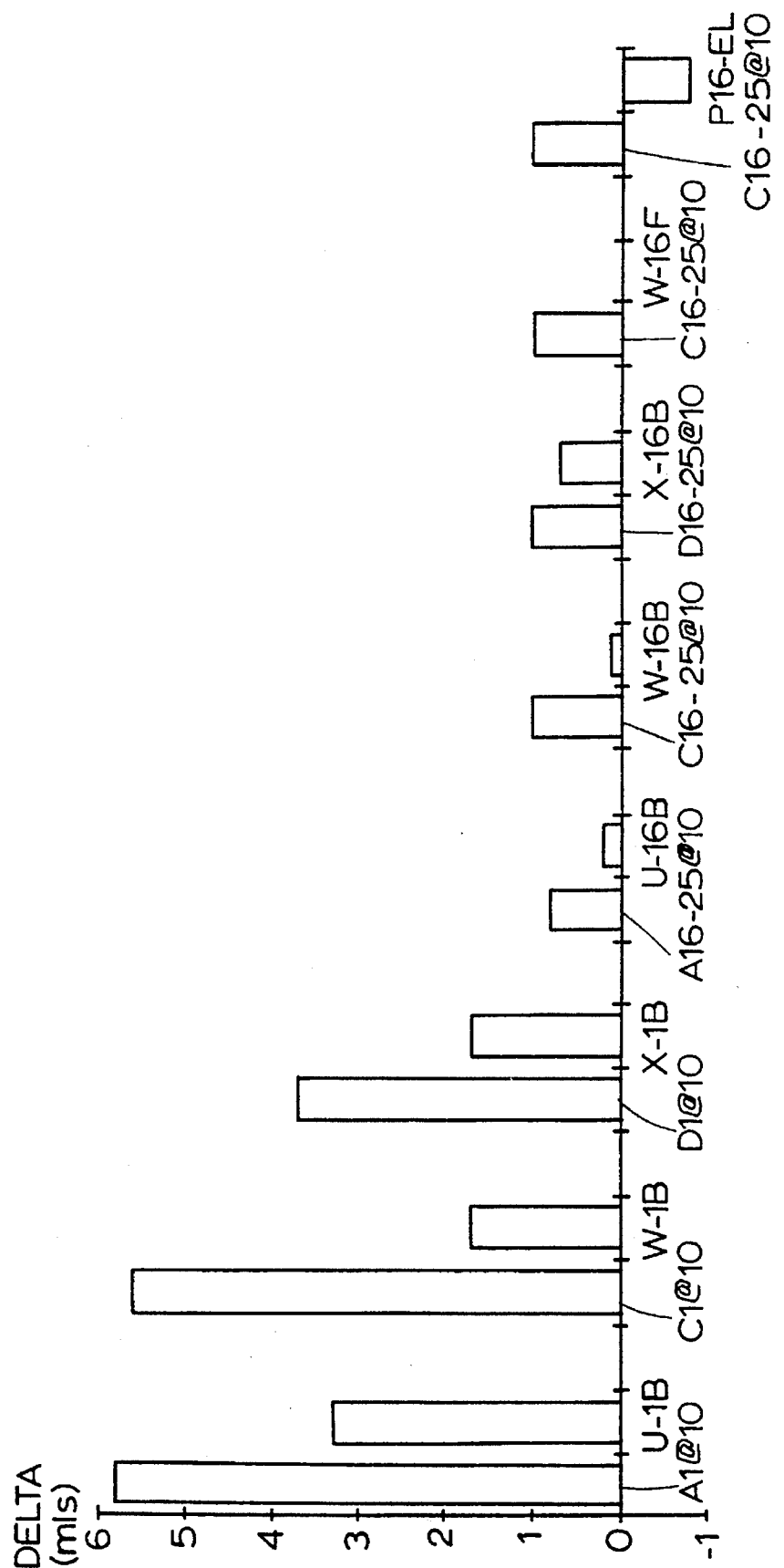
FIGS. 7–11 show the difference (DELTA VALUES) in fluid loss for rehydrated and non-rehydrated clays when in contact with DI water and contaminated water.

The data of Table 5 are shown in bar-graph form in FIG. 7.

TABLE 6

| SAMPLE | SAMPLE DESCRIPTION |
|---|---|
| P16-30 | Powdered base clay #5 mixed with 25 lb./ton of ALCOMER 228 and 10 lb./ton of SAPP, hydrated to 30% moisture content and Pug Milled. Sample was then dried and granulated. |
| P16-E27 | Powdered based clay #5 mixed with 25 lb./ton of ALCOMER 228 and 10 lb./ton of SAPP, hydrated to 27% moisture content and then Pug Milled and extruded. Sample was then dried and granulated. |
| P16-E27 (aged) | Powdered base clay #5 mixed with 25 lb./ton of ALCOMER 228 and 10 lb./ton of SAPP, hydrated to 27% moisture content and then Pug Milled and extruded. Aged several days then dried and granulated. |
| P16-E34 | Powdered base clay #5 mixed with 25 lb./ton of ALCOMER 228 and 10 lb./ton of SAPP, hydrated to 34% moisture content and the Pug Milled and extruded. Sample was then dried and granulated. |
| P16-E34 (aged) | Powdered base clay #5 mixed with 25 lb./ton of ALCOMER 228 and 10 lb./ton of SAPP, hydrated to 34% moisture content and then Pug Milled and extruded. Aged several days then dried and granulated. |
| P16-E17 | Powdered base clay #5 mixed with 25 lb./ton of ALCOMER 228 and 10 lb./ton of SAPP, hydrated to 17% moisture content and then Pug Milled and extruded. Sample was then dried and granulated. |
| P16-E17 | Powdered base clay #5 mixed with 25 lb./ton of |

TABLE 6-continued

| SAMPLE | SAMPLE DESCRIPTION |
|---|---|
| (aged) | ALCOMER 228 and 10 lb./ton of SAPP, hydrated to 17% moisture content, then Pug Milled and extruded, then dried and granulated. Aged several days then tested again. |
| P16-EL | Composite of 1:1 ratio of P16-27 (aged) and P16-34 (aged) samples. |

It is evident by the API fluid loss results of the foregoing Tables that the P16-EL sample is much more resistant to the various contaminated solutions than both the "dry-mixed" samples (B1 @10 and A1 @10) and the CYPAN rehydrated samples (U-1B, W-1B, and X-1B). The plant-produced P16-EL sample appears to be even more contaminant resistant than the laboratory "proto-type" W-16F. This may be due to the plant Pug Mill and extruder being able to mix the wetted clay mixture more efficiently than the laboratory Kitchen Aid Mixer.

Comparative fluid loss testing indicates that the rehydration process can be used with smectite, e.g., bentonite, clays without apparent interference to the rehydration enhancing effects. Likewise, the rehydration process did not appear to impede the effects of chemical additives. When certain saline-contaminated solutions were introduced, the rehydrated samples produced lower cumulative fluid loss values than the "dry-mixed" samples. The testing also suggests that the rehydrated and polymer-impregnated samples, when prehydrated with a saline contaminated solution, still produced more favorable, lower cumulative fluid loss values than the "dry-mixed" samples.

An experimental production run of the contaminant resistant sodium bentonite clay treated in accordance with the polymer rehydration process of the present invention was attempted in an actual production plant. Powdered sodium bentonite base clay #5 was mixed with 25 pounds per ton of clay, dry basis of ALCOMER 228, and 10 lb./ton of SAPP and then rewetted with water to hydrate the predried sample from 10% water to at least about 17% water, based on the dry weight of the clay. Thus, while the clay mixture was being fed into the Pug Mill, water was added to hydrate the sample from 17%–34% total moisture content. The first experimental run involved sending the wetted clay mixture through the Pug Mill. After passing through the Pug Mill, the wetted clay mixture was then dried immediately and granulated. The second experimental run involved extruding the wetted clay mixture after it was sent through the Pug Mill. After the wetted clay mixture was sent through both the Pug Mill and extruder, a small portion of the mixture was dried immediately and granulated. The remainder of the wetted, extruded mixture was allowed to age for several days prior to drying and granulating to see if aging was beneficial. It was found that the samples which had gone through the additional extrusion process produced lower filtrate values than the samples which were Pug Milled only. The sample which was Pug Milled only, was not aged. If it were aged, it might have produced lower fluid loss values than unaged.

It was also found that when the smectite clay was hydrated up to 25%–34% moisture content, dry clay basis, aging the extruded mixture was not necessary. However, when the clay was hydrated to only 17% moisture, it was found that aging the wetted mixture for several days was beneficial to obtain even lower filtrate rates. When the clay was hydrated to over 35%–40% moisture, the wetted polymer-impregnated clay had a tendency to plug both the Pug Mill and the extruder. Aged samples were dried and granulated in the laboratory. Also, the aged samples were tested on

TABLE 8

| SAMPLE | FLUID LOSS API (mls) 5000 ppm Sea Water Salt (dry) | FLUID LOSS API (mls) 10,000 ppm Sea Water Salt (dry) | FLUID LOSS API (mls) 1000 ppm Phenol | FLUID LOSS API (mls) 30,000 ppm Acetic Acid | FLUID LOSS API (mls) 10,000 ppm Acetone |
|---|---|---|---|---|---|
| B1 @ 10 | 20.2 | 40.1 | 11.8 | 18.8 | 11.7 |
| A1 @ 10 | 15.9 | 19.7 | 12.8 | 17.8 | 12.3 |
| C1 @ 10 | — | — | — | — | — |
| D1 @ 10 | — | — | — | — | — |
| U-1B | 11.1 | — | 9.2 | — | — |
| W-1B | 10.1 | 17.4 | 8.8 | 14.3 | 8.9 |
| X-1B | 8.9 | 16.7 | 7.9 | 28.8 | 7.7 |
| A16-25 @ 10 | — | — | — | — | — |
| C16-25 @ 10 | — | — | — | — | — |
| D16-25 @ 10 | — | — | — | — | — |
| U-16B | 8.2 | 12.2 | 8.6 | 9.5 | 8.1 |
| W-16B | 7.8 | 11.2 | 8.4 | 9.2 | 7.7 |
| X-16B | 7.0 | 10.8 | 7.1 | 15.6 | 6.7 |
| W-16F | 8.4 | 12.9 | 8.7 | 9.2 | 8.2 |
| W-16F-S | 8.2 | 12.7 | 8.5 | 9.2 | 8.2 |
| P16-EL | 7.3 | 12.1 | 8.3 | 8.7 | 8.2 | fluid loss apparatus, whereas the non-aged samples were tested using the production plant Lab apparatus. Samples P16-27 (aged) and P16-E34 (aged) were combined in equal quantities to make a larger composite sample called P16-EL. These samples (aged and nonaged) are described in Table 7, with fluid loss data using DI water and 1000 ppm CaCl$_2$ given in Table 7.

TABLE 7

| SAMPLE | FLUID LOSS API (mls) DI Water | FLUID LOSS API (mls) 1000 ppm CaCl$_2$ |
|---|---|---|
| P16-30 | 8.3 | 9.2 |
| P16-E27 | 7.9 | 7.5 |
| P16-E27 (aged) | 8.0 | 7.4 |
| P16-E34 | 7.9 | 7.2 |
| P16-E34 (aged) | 8.2 | 7.4 |
| P16-E17 | 8.8 | 7.9 |
| P16-E17 (aged) | 8.2 | 7.5 |
| P16-EL | 8.3 | 7.5 |

As can be seen in Table 7, the samples that were both Pug Milled and extruded produced lower fluid loss values than the samples that were Pug Milled only. The Pug Milled only samples, however, were not aged. It is also evident that the samples that were hydrated up to 27%–34% moisture content did not benefit from any additional aging, whereas the sample that was hydrated to only 17% moisture (P16-E17) did produce lower fluid loss values when aged. The plant experimental trial showed that the polymer rehydration process can be employed full scale at a plant. It also demonstrated that either a Pug Mill only or a combination of a Pug Mill and an extruder can be used in the polymer rehydration process on a plant scale basis. It also showed that the clay advantageously could be hydrated and polymer-impregnated from 17%–34% moisture content, dry clay basis.

The following data in Table 8 show that the product produced using the process of the present invention, using the polymer-impregnation, rehydration process, is resistant to a wide variety of contaminants, including dissolved inorganic salts, and organic liquids.

The data in the following tables are Top Loading Filter Press (LSK) table results, using the apparatus of FIG. 1, showing the filtrate collected with time through various polymer-impregnated bentonite clay samples and various contaminated waters.

Below in Table 8A is a summary listing the flow rate values for the Top Loading Filter Press (LSK Method) tests shown in Table 9. As can be seen, the flow rate values for the rehydrated samples are much lower than the "dry-mixed" samples.

TABLE 8A

Average FLOW RATE Values of
Top Loading Filter Press Tests (LSK)
Tables #3–6

| SAMPLE | Average FLOW RATE (grams/hour) |
|---|---|
| Base clay #1 | 34.1 |
| B1 @ 10 | 7.7 |
| A1 @ 10 | 8.0 |
| U-1B | 5.2 |
| W-1B | 4.0 |
| X-1B | 1.0 |
| U-16B | 0.6 |
| W-16B | 0.6 |
| X-16B | 0.5 |
| W-16F | 0.5 |
| W-16F-S | 0.5 |
| P16-EL | 0.4 |

TABLE 9

TOP-LOADING FILTER PRESS (LSK Method)
(Prehydrated with Tap Water/1% CaCl$_2$ Testing Solution)

| Cumulative Time (Hours) | Base Clay #1 Interval Filtrates (grams) | Base Clay #1 Cumul. Filtrates (grams) | B1 @ 10 Interval Filtrates (grams) | B1 @ 10 Cumul. Filtrates (grams) | A1 @ 10 Interval Filtrates (grams) | A1 @ 10 Cumul. Filtrates (grams) |
|---|---|---|---|---|---|---|
| 0.5 | 9.50 | 9.50 | 3.87 | 3.87 | 3.16 | 3.16 |
| 1 | 4.63 | 14.13 | — | — | 1.77 | 4.93 |
| 1.5 | 3.99 | 18.12 | 4.09 | 7.96 | 1.47 | 6.40 |
| 2 | 3.97 | 22.09 | 1.67 | 9.63 | 1.35 | 7.75 |
| 2.5 | 3.92 | 26.01 | 1.56 | 11.19 | 1.30 | 9.05 |
| 3 | 3.85 | 29.86 | 1.58 | 12.77 | 1.23 | 10.28 |
| 3.5 | 5.54 | 35.40 | — | — | 1.21 | 11.49 |
| 4 | 35.81 | 71.21 | 2.97 | 15.74 | 1.31 | 12.80 |
| 4.5 | — | — | 1.95 | 17.69 | 1.18 | 13.98 |
| 5 | 79.59 | 150.80 | 1.47 | 19.16 | — | — |
| 5.5 | 36.55 | 187.35 | 1.72 | 20.88 | 1.26 | 15.24 |
| 6 | discont. | discont. | 1.52 | 22.40 | 1.22 | 16.46 |
| 6.5 | | | 1.62 | 24.02 | 2.29 | 18.75 |
| 7 | | | 1.61 | 25.63 | 2.53 | 21.28 |
| 24 | | | 63.94 | 89.57 | 46.39 | 67.67 |
| 24.5 | | | 36.68 | 126.25 | 37.70 | 105.37 |
| 25 | | | 65.02 | 191.27 | 28.12 | 133.49 |
| 25.5 | | | discont. | discont. | 28.65 | 162.14 |
| 26 | | | | | 25.90 | 188.04 |
| 26.5 | | | | | 24.31 | 212.35 |
| Average flow rate (grams/hr.) | 34.1 | | 7.7 | | 8.0 | |

| Cumulative Time (Hours) | U-1B Interval Filtrates (grams) | U-1B Cumul. Filtrates (grams) | W-1B Interval Filtrates (grams) | W-1B Cumul. Filtrates (grams) | X-1B Interval Filtrates (grams) | X-1B Cumul. Filtrates (grams) |
|---|---|---|---|---|---|---|
| 0.50 | 1.38 | 1.38 | 1.07 | 1.07 | 1.49 | 1.49 |
| 1 | 0.96 | 2.34 | 0.89 | 1.96 | 0.93 | 2.42 |
| 1.5 | 0.90 | 3.24 | 0.80 | 2.76 | 0.65 | 3.07 |
| 2 | 0.79 | 4.03 | 0.69 | 3.45 | 0.35 | 3.80 |
| 2.5 | 0.73 | 4.76 | 0.65 | 4.10 | 0.64 | 4.44 |
| 3.5 | 1.22 | 5.98 | 1.24 | 5.34 | 1.20 | 5.64 |
| 4.5 | 1.16 | 7.14 | 1.03 | 6.37 | 0.99 | 6.63 |
| 5 | 0.67 | 7.81 | 0.56 | 6.93 | 0.52 | 7.15 |
| 5.5 | 0.61 | 8.42 | 0.56 | 7.49 | 0.49 | 7.64 |
| 6 | 0.64 | 9.06 | 0.56 | 8.05 | 0.51 | 8.15 |
| 6.5 | 0.63 | 9.69 | 0.55 | 8.60 | 0.48 | 8.63 |
| 7 | 0.64 | 10.33 | 0.55 | 9.15 | 0.50 | 9.13 |
| 7.5 | 0.61 | 10.94 | 0.52 | 9.67 | 0.46 | 9.59 |
| 24 | 21.17 | 32.11 | 14.59 | 24.26 | 11.73 | 21.32 |
| 24.5 | 3.51 | 35.62 | 1.33 | 25.59 | 0.67 | 21.99 |
| 25.5 | 7.84 | 43.46 | 4.25 | 29.84 | 1.20 | 23.19 |
| 26 | 5.86 | 49.32 | 2.71 | 32.55 | 0.58 | 23.77 |
| 26.5 | 7.73 | 57.05 | 2.95 | 35.50 | 0.60 | 24.37 |
| 27 | 8.58 | 65.63 | 2.89 | 38.39 | 0.55 | 24.90 |
| 27.5 | 9.95 | 75.58 | 3.95 | 42.34 | 0.61 | 25.53 |
| 28 | 10.61 | 86.19 | 8.40 | 50.74 | 0.60 | 26.13 |
| 28.5 | 11.42 | 97.61 | 11.75 | 62.49 | 0.59 | 26.72 |
| 29 | 10.65 | 108.26 | 12.95 | 75.44 | 0.60 | 27.32 |
| 29.5 | 11.69 | 119.95 | 14.12 | 89.56 | 0.59 | 27.91 |
| 30 | 20.56 | 140.51 | 18.30 | 107.86 | 0.76 | 28.67 |
| 30.5 | 19.40 | 159.91 | 13.19 | 121.05 | 0.51 | 29.18 |
| Average flow rate (grams/hr.) | 5.2 | | 4.0 | | 1.0 | |

| Cumulative Time (Hours) | U-16B Interval Filtrates (grams) | U-16B Cumul. Filtrates (grams) | W-16B Interval Filtrates (grams) | W-16B Cumul. Filtrates (grams) | X-16B Interval Filtrates (grams) | X-16B Cumul. Filtrates (grams) |
|---|---|---|---|---|---|---|
| 0.5 | 1.64 | 1.64 | — | — | — | — |
| 1 | 0.86 | 2.5 | 0.44 | 0.44 | 0.32 | 0.32 |
| 1.5 | 0.64 | 3.14 | 0.52 | 0.96 | 0.51 | 0.83 |
| 2 | 0.55 | 3.69 | 0.47 | 1.43 | 0.45 | 1.28 |

TABLE 9-continued

| Cumulative Time (Hours) | Interval Filtrates (grams) | Cumul. Filtrates (grams) | Interval Filtrates (grams) | Cumul. Filtrates (grams) | Interval Filtrates (grams) | Cumul. Filtrates (grams) |
|---|---|---|---|---|---|---|
| 2.5 | 0.50 | 4.19 | — | — | — | — |
| 3 | — | — | — | — | — | — |
| 3.5 | — | — | 1.43 | 2.86 | 1.36 | 2.64 |
| 4 | 1.27 | 5.46 | 0.39 | 3.25 | 0.40 | 3.04 |
| 4.5 | 0.44 | 5.90 | 0.37 | 3.62 | 0.36 | 3.40 |
| 5 | 0.42 | 6.32 | 0.39 | 4.01 | 0.39 | 3.79 |
| 5.5 | 0.41 | 6.73 | 0.38 | 4.39 | 0.37 | 4.16 |
| 6 | 0.39 | 7.12 | 0.39 | 4.78 | 0.37 | 4.53 |
| 6.5 | 0.37 | 7.49 | 0.34 | 5.12 | 0.34 | 4.87 |
| 24 | 7.65 | 15.14 | 7.47 | 12.59 | 6.25 | 11.12 |
| 24.5 | 0.54 | 15.68 | 0.50 | 13.09 | 0.45 | 11.57 |
| 25 | — | — | 0.41 | 13.50 | 0.33 | 11.90 |
| 25.5 | 0.75 | 16.43 | 0.40 | 13.90 | 0.32 | 12.22 |
| 26 | 0.36 | 16.79 | 0.39 | 14.29 | 0.30 | 12.52 |
| 26.5 | 0.35 | 17.14 | 0.44 | 14.73 | 0.36 | 12.88 |
| 27 | 0.36 | 17.50 | 0.33 | 15.06 | 0.28 | 13.16 |
| 27.5 | — | — | 0.39 | 15.45 | 0.29 | 13.45 |
| 28 | 0.67 | 18.17 | — | — | — | — |
| 28.5 | 0.46 | 18.63 | — | — | — | — |
| 29 | 0.33 | 18.96 | 1.05 | 16.50 | 0.85 | 14.30 |
| 29.5 | 0.43 | 19.39 | 0.40 | 16.90 | 0.29 | 14.59 |
| 30 | 0.34 | 19.73 | 0.38 | 17.28 | 0.28 | 14.87 |
| 30.5 | 0.36 | 20.09 | — | — | — | — |
| 31 | 0.33 | 20.42 | 0.76 | 18.04 | 0.57 | 15.44 |
| 31.5 | — | — | 0.35 | 18.39 | 0.25 | 15.69 |
| 48 | 7.03 | 27.45 | 7.63 | 26.02 | 5.80 | 21.49 |
| 48.5 | 0.50 | 27.95 | 0.50 | 26.52 | 0.38 | 21.87 |
| 49 | 0.44 | 28.39 | 0.43 | 26.95 | 0.33 | 22.20 |
| 49.5 | 0.41 | 28.80 | 0.43 | 27.38 | 0.35 | 22.55 |
| 50 | 0.45 | 29.25 | 0.57 | 27.95 | 0.29 | 22.84 |
| 50.5 | 0.41 | 29.66 | 0.93 | 28.88 | 0.33 | 23.17 |
| 51 | 0.44 | 30.10 | 0.53 | 29.41 | 0.32 | 23.49 |
| 51.5 | 0.44 | 30.54 | 0.53 | 29.94 | 0.33 | 23.82 |
| 52.5 | 0.81 | 31.35 | — | — | — | — |
| 53 | 0.46 | 31.81 | — | — | — | — |
| 54 | — | — | 2.36 | 32.36 | 1.40 | 25.22 |
| 54.5 | — | — | 0.55 | 32.85 | 0.36 | 25.58 |
| 55 | 1.57 | 33.38 | — | — | — | — |
| 55.5 | 0.41 | 33.79 | — | — | — | — |
| Average flow rate (grams/hr.) | 0.6 | | 0.6 | | 0.5 | |

|  | W-16F | | W-16F-S | | P16-EL | |
|---|---|---|---|---|---|---|
| Cumulative Time (Hours) | Interval Filtrates (grams) | Cumul. Filtrates (grams) | Interval Filtrates (grams) | Cumul. Filtrates (grams) | Interval Filtrates (grams) | Cumul. Filtrates (grams) |
| 0.5 | 0.12 | 0.12 | 0.93 | 0.93 | 0.11 | 0.11 |
| 1 | 0.52 | 0.64 | 0.69 | 1.62 | — | — |
| 1.5 | 0.39 | 1.03 | 0.63 | 2.25 | 0.69 | 0.80 |
| 2 | — | — | — | — | 0.27 | 1.07 |
| 2.5 | — | — | — | — | 0.21 | 1.28 |
| 3 | — | — | — | — | 0.22 | 1.50 |
| 3.5 | 1.41 | 2.44 | 1.47 | 3.72 | — | — |
| 4 | 0.34 | 2.78 | 0.39 | 4.11 | 0.45 | 1.95 |
| 4.5 | — | — | — | — | 0.28 | 2.23 |
| 5 | 0.68 | 3.46 | 0.65 | 4.76 | 0.18 | 2.41 |
| 5.5 | 0.30 | 3.76 | 0.24 | 5.00 | 0.26 | 2.67 |
| 5 | 0.32 | 4.08 | 0.34 | 5.34 | 0.20 | 2.87 |
| 6.5 | 0.29 | 4.37 | 0.32 | 5.66 | 0.21 | 3.08 |
| 7 | — | — | — | — | 0.22 | 3.30 |
| 24 | 5.89 | 10.26 | 5.93 | 11.59 | 4.36 | 7.66 |
| 24.5 | 0.44 | 10.70 | 0.51 | 12.10 | 0.39 | 8.05 |
| 25 | 0.32 | 11.02 | 0.44 | 12.54 | 0.24 | 8.29 |
| 25.5 | 0.37 | 11.39 | 0.40 | 12.94 | 0.22 | 8.51 |
| 26 | 0.30 | 11.69 | 0.33 | 13.27 | 0.25 | 8.76 |
| 26.5 | — | — | — | — | 0.23 | 8.99 |
| 27 | 0.54 | 12.23 | 0.52 | 13.79 | 0.20 | 9.19 |
| 27.5 | — | — | — | — | 0.24 | 9.43 |
| 28.5 | 1.28 | 13.51 | 1.32 | 15.11 | — | — |
| 29 | 0.25 | 13.76 | 0.33 | 15.44 | 0.43 | 9.86 |
| 29.5 | 0.30 | 14.06 | 0.23 | 15.67 | 0.28 | 10.14 |
| 30 | 0.32 | 14.38 | 0.33 | 16.00 | — | — |
| 30.5 | 0.30 | 14.68 | 0.34 | 16.34 | — | — |
| 31 | 0.25 | 14.93 | 0.29 | 16.63 | 0.78 | 10.92 |
| 31.5 | — | — | — | — | 0.23 | 11.15 |
| 48 | 6.38 | 21.31 | 6.11 | 22.74 | 5.44 | 16.59 |

TABLE 9-continued

| | | | | | | |
|---|---|---|---|---|---|---|
| 48.5 | 0.42 | 21.73 | 0.44 | 23.18 | 0.35 | 16.94 |
| 49 | 0.33 | 22.06 | 0.40 | 23.58 | 0.24 | 17.18 |
| 49.5 | 0.35 | 22.41 | 0.23 | 23.81 | — | — |
| 50 | 0.32 | 22.73 | 0.33 | 24.14 | 0.52 | 17.70 |
| 50.5 | 0.32 | 23.05 | 0.36 | 24.50 | 0.22 | 17.92 |
| 51 | 0.32 | 23.37 | 0.19 | 24.69 | 0.32 | 18.24 |
| 51.5 | 0.31 | 23.68 | 0.37 | 25.06 | 0.26 | 18.50 |
| 52.5 | 0.58 | 24.26 | 0.51 | 25.57 | — | — |
| 53 | 0.48 | 24.74 | 0.47 | 26.04 | 0.61 | 19.11 |
| 53.5 | 0.35 | 25.09 | 0.35 | 26.39 | 0.21 | 19.32 |
| 54 | 0.27 | 25.36 | 0.28 | 26.67 | — | — |
| 54.5 | — | — | — | — | 0.43 | 19.75 |
| 55 | — | — | — | — | 0.18 | 19.93 |
| 55.5 | — | — | — | — | 0.17 | 20.10 |
| Average flow rate (grams/hr.) | | 0.5 | | 0.5 | | 0.4 |

The results from the Top Loading Filter Press test (LSK) tables show favorably lower filtrate values for all of the rehydrated samples (U-1B, W-1B, X-1B, U-16B, W-16B, X-16B, W-16F, W-16F-S, and P16-EL) versus the "dry mixed" samples (B1 @10 and A1 @10) as shown in the following flow rate summary Table 10. The rehydrated samples were unexpectedly more resistant to the calcium contamination than the dry-mixed samples. However, the samples that were rehydrated with the ALCOMER 228 polymer produced even lower filtrate values than the rehydrated CYPAN samples. These results tend to parallel the API Fluid Loss results. The data of the filter press tests are presented in graph form in the drawings, FIGS. 2 through 6.

TABLE 10

Average FLOW RATE Values of
Top Loading Filter Press Tests (LSK)
Tables #3–6

| SAMPLE | Average FLOW RATE (grams/hour) |
|---|---|
| Base clay #1 | 34.1 |
| B1 @ 10 | 7.7 |
| A1 @ 10 | 8.0 |
| U-1B | 5.2 |
| W-1B | 4.0 |
| X-1B | 1.0 |
| U-16B | 0.6 |
| W-16B | 0.6 |
| X-16B | 0.5 |
| W-16F | 0.5 |
| W-16F-S | 0.5 |
| P16-EL | 0.4 |

A sample of ocean water was obtained from Hawaii (R93-720). The conductivity of this Hawaii ocean water was 356,000 micro mhos and the pH was 8.2. Comparative Top Loading Filter Press Tests (LSK Method) were performed using this ocean water as the testing solution. The results are shown in Table 11 and in the graph of FIG. 6.

Figure 6:
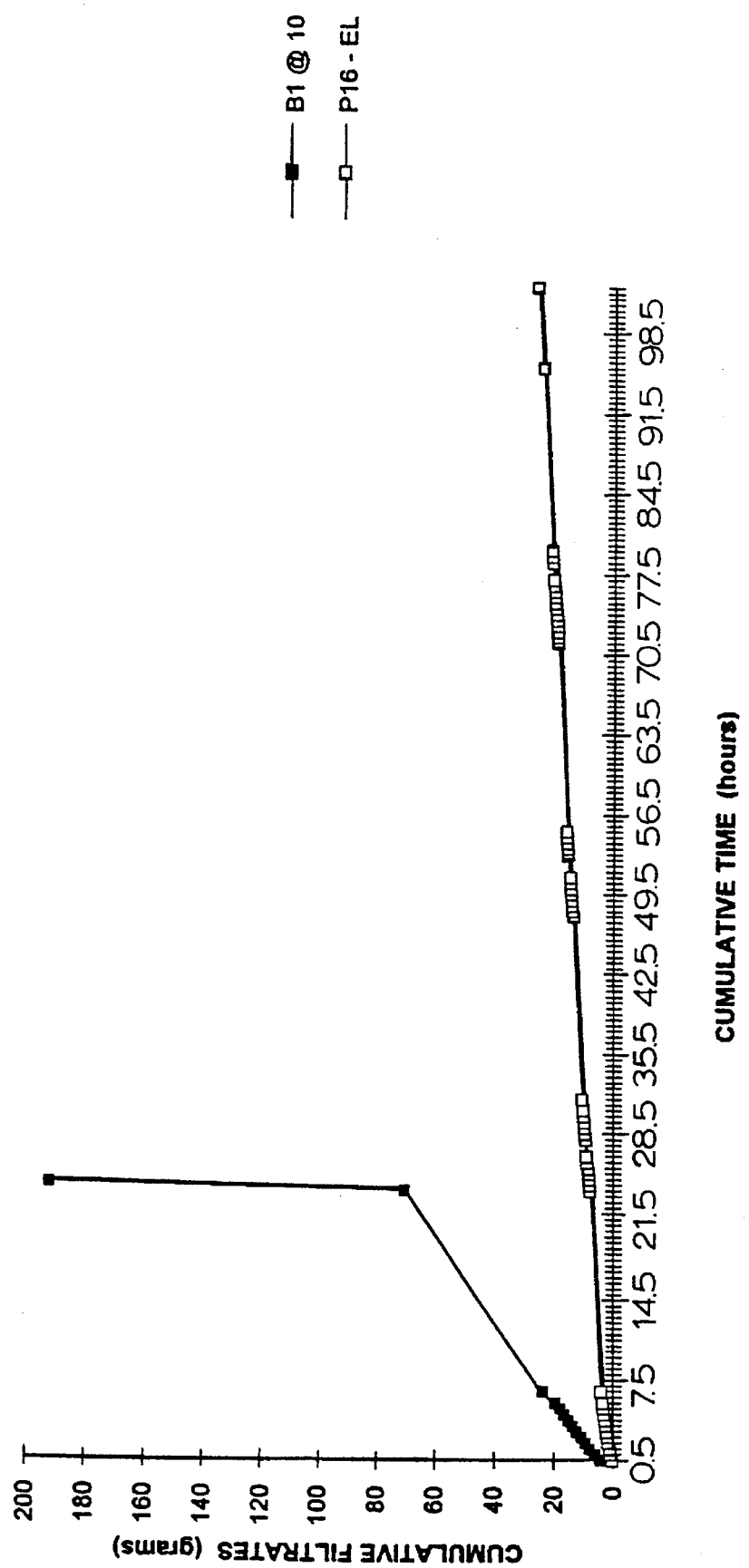
FIG. 6 is a graph showing fluid loss of two rehydrated, polymer-impregnated bentonite, redried bentonite clays using Hawaii Ocean water as the contaminated water test solution.

As can be seen in Table 11 and FIG. 6, the P16-EL sample was much more able to withstand the chemical attack from the Hawaii ocean water sample than the "dry-mixed" sample. The B1 @10 sample lasted only 24.5 hours before the sample failed and all of the testing solution leaked through. The contaminant resistant P16-EL sample was able to last over four times longer and could have lasted even longer if the test were extended. The test indicates that the polymer rehydration process produces a smectite clay product that is highly resistant to NaCl-contaminated ocean water.

TABLE 11

TOP-LOADING FILTER PRESS (LSK Method)
(Prehydrated with Tap Water/
Hawaii Ocean Water as Testing Solution)

| | B1 @ 10 | | P16-EL | |
|---|---|---|---|---|
| Cumulative Time (Hours) | Interval Filtrates (grams) | Cumulative Filtrates (grams) | Interval Filtrates (grams) | Cumulative Filtrates (grams) |
| 0.5 | 4.12 | 4.12 | 0.18 | 0.18 |
| 1 | 2.02 | 6.02 | 0.56 | 0.74 |
| 1.5 | 1.63 | 7.77 | 0.34 | 1.08 |
| 2 | 1.46 | 9.23 | 0.40 | 1.48 |
| 2.5 | 1.44 | 10.67 | 0.30 | 1.78 |
| 3 | 1.50 | 12.17 | 0.35 | 2.13 |
| 3.5 | 1.41 | 13.58 | 0.32 | 2.45 |
| 4 | 1.37 | 14.95 | 0.17 | 2.62 |
| 4.5 | 1.40 | 16.35 | 0.27 | 2.89 |
| 5 | 1.39 | 17.74 | 0.28 | 3.17 |
| 5.5 | 1.74 | 19.48 | 0.33 | 3.50 |
| 6.5 | 4.12 | 23.60 | 0.41 | 3.91 |
| 24 | 46.73 | 70.33 | 3.62 | 7.53 |
| 24.5 | 121.27 | 191.60 | 0.29 | 7.82 |
| 25 | Ended | Ended | 0.18 | 8.00 |
| 25.5 | | | 0.11 | 8.11 |
| 26 | | | 0.22 | 8.33 |
| 26.5 | | | 0.22 | 8.55 |
| 27 | | | 0.21 | 8.76 |
| 28.5 | | | 0.47 | 9.23 |
| 29 | | | 0.20 | 9.43 |
| 29.5 | | | 0.15 | 9.58 |
| 30 | | | 0.08 | 9.66 |
| 30.5 | | | 0.17 | 9.83 |
| 31 | | | 0.14 | 9.97 |
| 32 | | | 0.37 | 10.34 |
| 48 | | | 3.16 | 13.50 |
| 48.5 | | | 0.24 | 1.74 |
| 49 | | | 0.19 | 13.93 |
| 49.5 | | | 0.17 | 14.10 |
| 50 | | | 0.14 | 14.24 |
| 50.5 | | | 0.16 | 14.40 |
| 51 | | | 0.07 | 14.47 |
| 51.5 | | | 0.10 | 14.57 |
| 53.5 | | | 0.68 | 15.25 |
| 54 | | | 0.16 | 15.41 |
| 54.5 | | | 0.16 | 15.57 |
| 55 | | | 0.04 | 15.61 |
| 55.5 | | | 0.18 | 15.79 |
| 72 | | | 2.95 | 18.74 |
| 72.5 | | | 0.08 | 18.82 |
| 73 | | | 0.11 | 18.93 |
| 73.5 | | | 0.15 | 19.08 |
| 74 | | | 0.20 | 19.28 |

TABLE 11-continued

TOP-LOADING FILTER PRESS (LSK Method)
(Prehydrated with Tap Water/
Hawaii Ocean Water as Testing Solution)

|  | B1 @ 10 | | P16-EL | |
| --- | --- | --- | --- | --- |
| Cumulative Time (Hours) | Interval Filtrates (grams) | Cumulative Filtrates (grams) | Interval Filtrates (grams) | Cumulative Filtrates (grams) |
| 74.5 | | | 0.18 | 19.46 |
| 75 | | | 0.16 | 19.62 |
| 75.5 | | | 0.18 | 19.80 |
| 76 | | | 0.16 | 19.96 |
| 76.5 | | | 0.05 | 20.01 |
| 77 | | | 0.17 | 20.18 |
| 77.5 | | | 0.21 | 20.39 |
| 79 | | | 0.46 | 20.85 |
| 79.5 | | | 0.18 | 21.03 |
| 80 | | | 0.06 | 21.09 |
| 96 | | | 2.91 | 24.00 |
| 103 | | | 2.11 | 26.11 |
| Average flow rate (grams/hr.) | | 7.8 | | 0.25 |

Other polymers and fluid loss agents were tested to determine if any particular ionic charge is essential for the water-soluble impregnated polymer to aid the smectite, e.g., sodium bentonite, clay in absorbing contaminated water when the dissolved polymer is impregnated into the clay, to rewet the clay, and the clay then is redried in accordance with the present invention. The additional polymers and fluid loss agents tested were MAGNIFLOC 903N (a nonionic polyacrylamide) from American Cyanamid Co., JAGUAR CDP (an anionic guar gum) from Rhone-Poulenc, and MON PAC ULTRA LOW (a sodium carboxymethyl cellulose or CMC) from Montello, as shown in Table 12. As with the previous polymers, samples were prepared using both the "dry" method (untreated dried granular sodium bentonite base clay, dry polymer, and dry SAPP) and the Rehydration Method of the present invention. As can be seen in Tables 13 and 14, the rehydrated samples showed unexpectedly lower fluid loss values than their "dry" counterparts. This proves that the method of the present invention improves fluid loss characteristics using nonionic polymers, and anionic polymers, e.g., guar gums, and nonionic polymers, e.g., CMC—not just anionic, e.g., polyacrylamide, polymers. Although the fluid loss results of the samples prepared with these chemical additives are not as favorably low as the samples made with the preferred ALCOMER 228 polymer, they do show that the method of the present invention is not selective to anionic polymers only.

Figure 8:
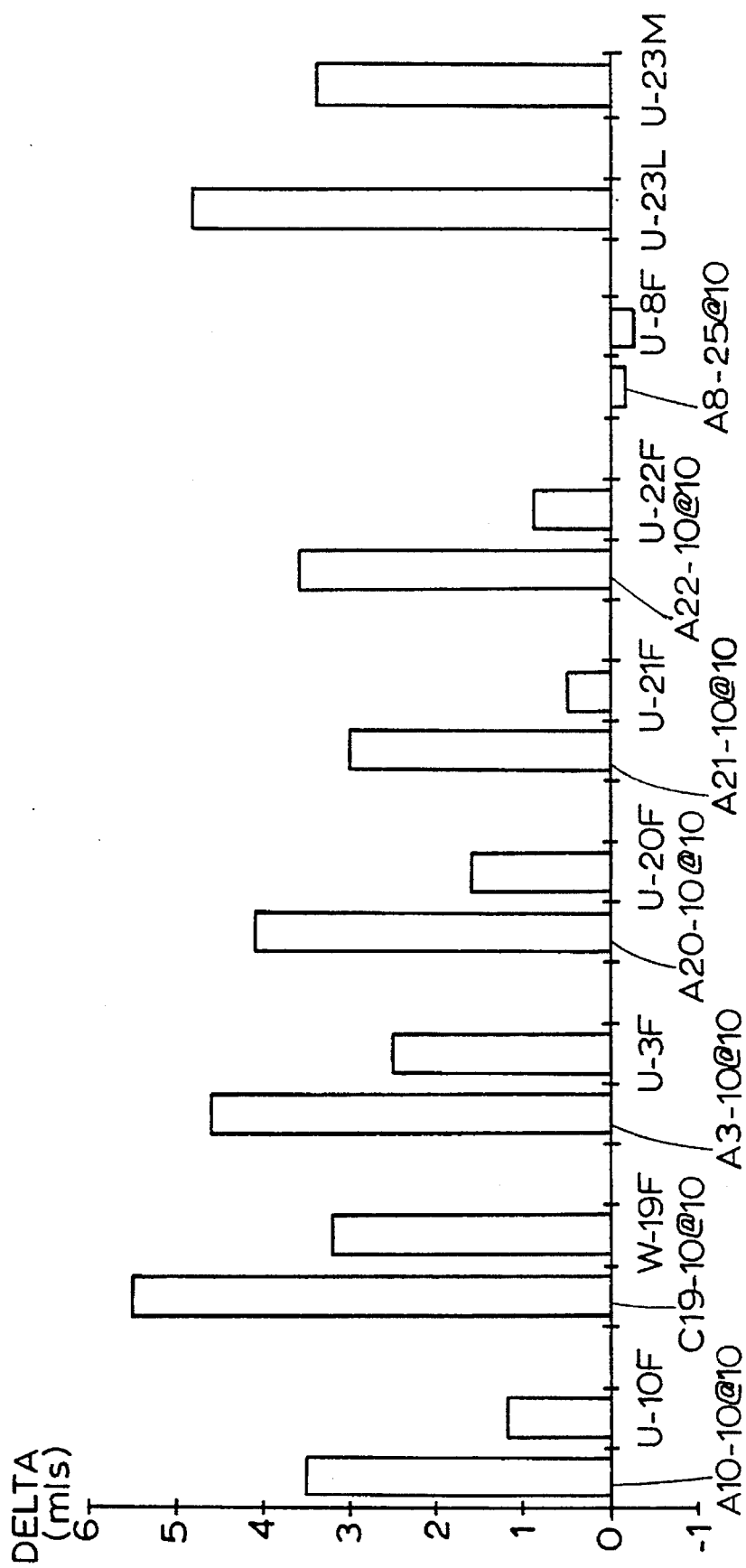

The fluid loss data shows that with 1000 ppm calcium chloride contaminated solution, the rehydrated samples performed unexpectedly better than their "dry" counterparts, as emphasized in FIG. 8. However, it should be noted that (with the exception of MON PAC CMC) although the rehydrated samples showed improved fluid loss values over the "dry" samples, there was still some degradation from the calcium contamination when compared to the deionized (DI) water fluid loss values. In the previous testing, it was evident that samples rehydrated with the preferred ALCOMER 228 polymer, showed little to no difference between the calcium contaminated fluid loss values and the DI water fluid loss values. This indicates that although the method of the present invention can be used with other polymer groups and fluid loss reduction water-soluble polymers, the method provides the best results using the preferred ALCOMER 228 polymer, with respect to calcium contamination.

The exceptions to this characteristic were CMC samples, as shown in Tables 13 and 14. Both the "dry" and rehydrated CMC samples showed little to no difference in fluid loss values when dispersed in 1000 ppm $CaCl_2$, versus DI water. Although these CMC samples may seem promising with respect to calcium contamination resistance (as did the ALCOMER 228 polymer), it may not be advisable to use CMC, guar gums, or any other natural organic derivative that will degrade with time, in a product that must remain stable in place for long periods of time, because aging causes CMC and guars to ferment. However, fermentation of additives can be prevented by adding a biocide, e.g., together with the polymer, to inhibit bacterial growth.

TABLE 12

| SAMPLE NAME | DESCRIPTION |
| --- | --- |
| A10-10 @ 10 | Dry granular base clay #4 mixed with 10 lb./ton of OFXC 1146 cationic polymer, and 10 lb./ton of SAPP. |
| C19-10 @ 10 | Dry granular base clay #5, 10 lb./ton of Magnifloc 903N nonionic polymer, and 10 lb./ton of SAPP. |
| A3-10 @ 10 | Dry granular base clay #4, 10 lb./ton of Jaguar CDP, and 10 lb./ton of SAPP. |
| A20-10 @ 10 | Dry granular base clay #4 mixed with 10 lb./ton of Jaguar 8920 cationic guar, and 10 lb./ton of SAPP. |
| A21-10 @ 10 | Dry granular base clay #4 mixed with 10 lb./ton of Jet Jel nonionic guar, and 10 lb./ton of SAPP. |
| A22-25 @ 10 | Dry granular base clay #4 mixed with 25 lb./ton of Sigma CMC, and 10 lb./ton of SAPP. |
| A8-25 @ 10 | Dry granular base clay #4, 25 lb./ton of Mon Pac CMC, and 10 lb./ton of SAPP. |
| U-10F | Powdered base clay #4 rehydrated with 10 lb./ton of OFXC 1146 and 10 lb./ton of SAPP using Single Rehydration Method. |
| W-19F | Powdered base clay #5 rehydrated with 10 lb./ton of Magnifloc 903N nonionic polymer, and 10 lb./ton of SAPP using Single Rehydration Method. |
| U-3F | Powdered base clay #4 rehydrated with 10 lb./ton of Jaguar CDP and 10 lb./ton of SAPP using the Single Rehydration Method. |
| U-20F | Powdered base clay #4 rehydrated with 10 lb./ton of Jaguar 8920 cationic guar gum and 10 lb./ton of SAPP using Single Rehydration Method. |
| U-21F | Powdered base clay #4 rehydrated with 10 lb./ton of Jet Jel and 10 lb./ton of SAPP using Single Rehydration Method. |
| U-22F | Powdered base clay #4 rehydrated with 25 lb./ton of Sigma CMC and 10 lb./ton of SAPP using Single Rehydration Method. |
| U-8F | Powdered base clay #4 rehydrated with 25 lb./ton of Mon Pac CMC and 10 lb./ton of SAPP using the Single Rehydration Method. |
| U-23L | Dry granular base clay #4 rehydrated with 53.7 lb./ton of Pluradyne CA 135 and the amount of water equal to the weight of the clay used. |
| U-23M | Dry granular base clay #4 rehydrated with 90.9 lb./ton of Pluradyne CA 135 and the amount of water equal to the weight of the clay used. |

TABLE 13

| SAMPLE | FLUID LOSS API (mls) Deionized Water | FLUID LOSS API (mls) 1000 PPM $CaCl_2$ |
| --- | --- | --- |
| A10-10 @ 10 | 12.7 | 16.2 |
| C19-10 @ 10 | 11.6 | 17.1 |
| A3-10 @ 10 | 12.5 | 17.1 |
| A20-10 @ 10 | 14.1 | 18.2 |

TABLE 13-continued

| SAMPLE | FLUID LOSS API (mls) Deionized Water | FLUID LOSS API (mls) 1000 PPM CaCl$_2$ |
|---|---|---|
| A21-10 @ 10 | 13.5 | 16.5 |
| A22-25 @ 10 | 9.7 | 13.3 |
| A8-25 @ 10 | 10.5 | 10.3 |
| U-10F | 11.0 | 12.2 |
| W-19F | 9.8 | 13.0 |
| U-3F | 11.0 | 13.5 |
| U-20F | 11.9 | 13.5 |
| U-21F | 12.2 | 12.7 |
| U-22F | 8.5 | 9.4 |
| U-8F | 9.5 | 9.2 |
| U-23L | 14.9 | 19.7 |
| U-23M | 18.2 | 21.6 |

TABLE 14

Comparative DELTA Values between DI Water API Fluid Losses and 1000 ppm CaCl$_2$ API Fluid Losses

| Base Clay/Polymer/ SAPP Combination | DELTA (mls) "Dry-Mixed" | DELTA (mls) Rehydrated |
|---|---|---|
| Base clay #4, 10 lb./ton OFXC 1146 cationic polymer, 10 lb./ton SAPP | 3.5 | 1.2 |
| Base clay #5, 10 lb./ton Magnifloc 903 nonionic polymer, 10 lb./ton SAPP | 5.5 | 3.2 |
| Base clay #4, 10 lb./ton Jaguar CDP anionic guar, 10 lb./ton SAPP | 4.6 | 2.5 |
| Base clay #4, 10 lb./ton Jaguar 8920 cationic guar, 10 lb./ton SAPP | 4.1 | 1.6 |
| Base clay #4, 10 lb./ton Jet Jel nonionic guar, 10 lb./ton SAPP | 3.0 | 0.5 |
| Base clay #4, 25 lb./ton Sigma CMC, 10 lb./ton SAPP | 3.6 | 0.9 |
| Base clay #4, 25 lb./ton Mon Pac CMC, 10 lb./ton SAPP | −0.2 | −0.3 |
| Base clay #4, 53.7 lb./ton of Pluradyne CA 135 Polyethylene imine | — | 4.8 |
| Base clay #4, 90.9 lb./ton of Pluradyne CA 135 Polyethylene imine | — | 3.4 |

Figure 9:
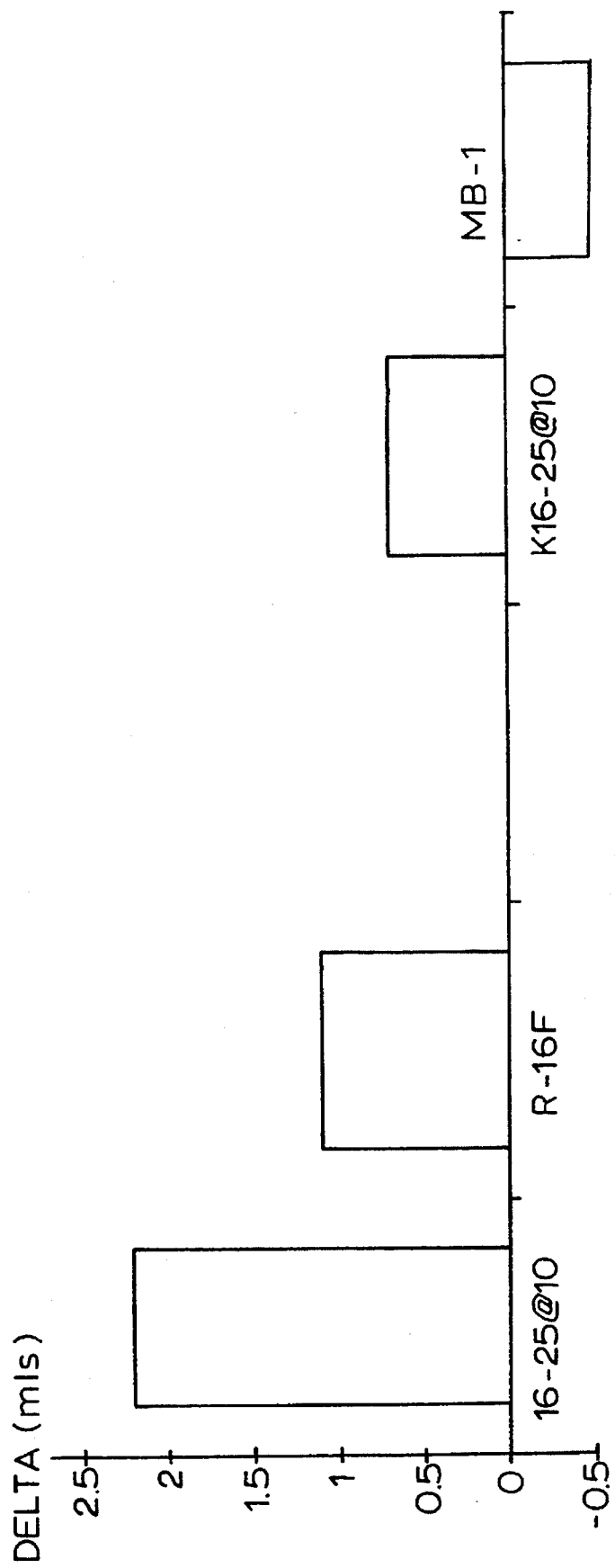

The DELTA values of Table 14 are graphed in FIG. 9

Other suitable water-soluble polymers include polyvinylpyrrolidone (PVP), having a monomeric structure as follows:

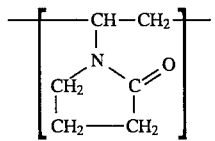

The water-solubility of PVP depends upon the degree of hydrolysis of the polyvinylpyrrolidone, and whether the PVP is in the form of a metal salt of PVP, such as sodium or potassium. For example, some or all of the PVP monomeric units can be hydrolyzed to the structure:

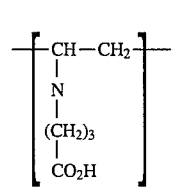

and the PVP can be used in the salt form, e.g., sodium or potassium polyvinylpyrrolidone. The molecular weight of the PVP polymer (or any other water-soluble polymer disclosed herein) is not critical so long as the polymer is water-soluble. The polymer should be sufficiently water-soluble to provide at least 1 gram of dissolved polymer in 100 milliliters of water to sufficiently impregnate the smectite clay. Any undissolved polymer will not deleteriously affect the clay impregnation step. Excellent results can be obtained with PVP having weight average molecular weights in the range of about 225 to about 1,000,000 or more, preferably about 2,000 to about 100,000.

Other PVP derivatives that are water-soluble include the following: N-Methylpyrrolidone (NMP); N-Ethylpyrrolidone (NEP); and N-Vinylpyrrolidone, having the structures:

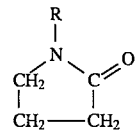

NMP: R = CH$_3$
NEP: R = CH$_3$CH$_2$
NVP: R = CH$_2$:CH

Other substituted water-soluble pyrrolidones useful in accordance with the present invention include: N-isopropyl-5-methylpyrrolidone; pyrrolidone-N-acetic acid; N-cyclohexyl-pyrrolidone; and hexamethylene-bis(2-pyrrolidone).

Other water-soluble polymers useful for impregnating the smectite clay in accordance with the present invention include poly(ethylene oxide) having monomer units: ─[O─(CH$_2$)─(CH$_2$)]─, hereinafter PEO; available as PLURACOL E from Wyandote, and POLYOX WSR or CARBOWAX from Union Carbide—water-soluble even at the very high molecular weights, e.g., 1,000,000 or more; poly(propylene oxide), having monomer units:

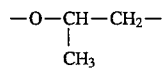

water-soluble only in the oligomer form, having weight average molecular weights from about 100 to about 1,000, preferably about 100 to about 500; propyl(vinyl methyl ether), having monomer units:

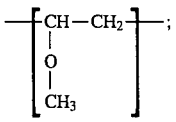

and their hydrolysis product derivatives. Poly(vinyl methyl ether) is water-soluble and available commercially as GANTREZ M from GAF Corporation and is water-soluble, like PEO, at room temperature, at very high molecular weights, e.g., from about 120 to about 1,000,000 and more. Another suitable water-soluble polymer is polyoxymethylene (POM), having monomer units $-[C-CH_2]-$, which are water-soluble in the very short oligomer form, i.e., poly(formaldehyde) and having a melting point of about 180° C., and weight average molecular weights from about 40 to about 400. Oxide copolymers also are suitable, including random and block copolymers of poly(ethylene oxide) with a variety of monomers, including propylene oxide and/or poly(propylene oxide). One particularly useful copolymer is sold as PLURONIC F68 having a poly(propylene oxide) core molecular weight of about 1,800 and including 80% w/w ethylene oxide units, giving a combined molecular weight for the two outer poly(ethylene oxide) sections of 6,600—for a combined weight average molecular weight of 8,400.

The polyacrylic acid polymers are also suitable, having monomer units:

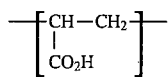

and are commercially available as CARBOPOL resins from B. F. Goodrich and PRIMAL resins from Rohn & Haas. The water-soluble polyacrylic acid and polyacrylate polymer can be non-cross-linked or slightly cross-linked.

Other, water-soluble derivatives of, and substituted, polyacrylic acid also are useful in accordance with the present invention, such as poly(methacrylic acid), (PMAA), having a monomeric structure:

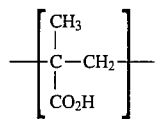

Similar water-soluble polymers that are suitable in accordance with the present invention include poly(methacrylamide), of PMAAm, having the general monomeric structure:

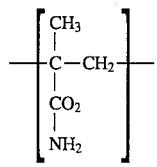

Poly(N,N-Dimethylacrylamide), having the general monomeric structure:

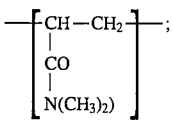

Poly(N-Isopropylacrylamide), or PIPAAm, having the monomeric structure:

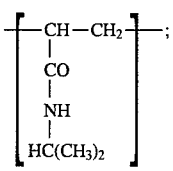

Poly(N-acetamidoacrylamide), having a monomeric structure:

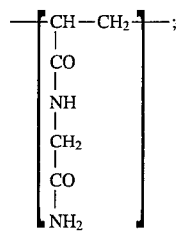

Poly(N-acetamidomethacrylamide), having a monomeric structure:

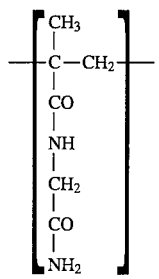

Water-soluble copolymers including any one or more of the above-described acrylic polymers also are useful in accordance with the principles of the present invention including the acrylic interpolymers of polyacrylic acid and poly(methacrylic acid); polyacrylic acid with poly(methacrylamide) and/or poly(acrylamide); and polyacrylic acid with methacrylic acid.

Suitable water-soluble vinyl polymers include poly(vinyl alcohol):

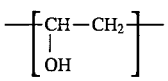

poly (vinyl acetate):

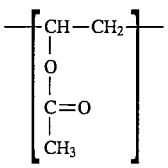

and their copolymers, e.g., poly(vinylacetate-co-vinyl alcohol):

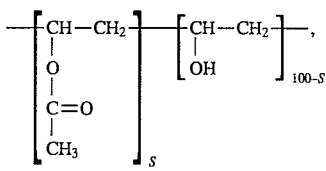

also known as partially hydrolyzed poly(vinylacetate) or partially acetylated poly(vinyl alcohol), available commercially from DuPont as ELVANOL and from Airco Chemical as VINOL.

Other suitable water-soluble polymers include polyvinyloxazolidone (PVO) and polyvinylmethyloxazolidone (PVMO), having the monomeric structures:

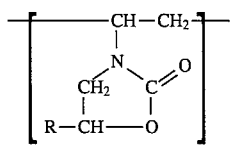

PVO: R = H
PVMO: R = CH₃

Blue bentonites and calcium bentonites also were tested after treatment in accordance with the present invention. Tables 16 and 17 show the results of the polymer rehydration process on blue and calcium bentonites—the particular clay and polymer impregnated being shown in Table 15. The results show that the polymer rehydration process of the present invention improves the contaminant resistance of both blue bentonite and calcium bentonites, as well as the sodium bentonite tested supra.

TABLE 15

| SAMPLE | DESCRIPTION |
|---|---|
| 116-25 @ 10 | Dry granular blue base clay #7 mixed with 25 lb./ton of ALCOMER 228 and 10 lb./ton of SAPP. |
| R-16F | Dry granular blue base clay #7 and 25 lb./ton of ALCOMER 228 and 10 lb./ton of SAPP rehydrated up to 35% moisture using Single Rehydration method. |
| K16-25 @ 10 | Dry granular blue base clay #6 mixed with 25 lb./ton of ALCOMER 228 and 10 lb./ton of SAPP. |
| MB-1 | Dry granular blue base clay #6 and 25 lb./ton of ALCOMER 228 and 10 lb./ton of SAPP rehydrated up to 35% moisture using Single Rehydration Method. |
| L16 @ 25 | Dry calcium base clay #8 mixed with 25 lb./ton of ALCOMER 228 polymer. |
| Y-16Q | Calcium base clay #8 and 25 lb./ton of ALCOMER 228 rehydrated up to 50% moisture using Single Rehydration Method. |

TABLE 16

| SAMPLE | API FLUID LOSS (mls) (DI Water) | API FLUID LOSS (mls) 1000 ppm CaCl₂ |
|---|---|---|
| 116-25 @ 10 | 13.2 | 15.4 |
| R-16F | 11.6 | 12.7 |
| K16-25 @ 10 | 11.3 | 11.9 |
| MB-1 | 10.5 | 10.0 |
| L16 @ 25 | 34.4 | 96.2 |
| Y-16Q | 25.4 | 56.7 |

TABLE 17

Comparative DELTA Values between DI Water API Fluid Losses and 1000 ppm CaCl₂ Fluid Losses

| Base Clay/Polymer/ SAPP Combination | DELTA (mls) "Dry-Mixed" | DELTA (mls) Rehydrated |
|---|---|---|
| Blue base clay #7, 25 lb./ton of ALCOMER 228 polymer, and 10 lb./ton of SAPP | 2.2 | 1.1 |
| Blue base clay #6, 25 lb./ton of ALCOMER 228 polymer, and 10 lb./ton of SAPP | 0.7 | −0.5 |

TABLE 17-continued

Comparative DELTA Values between DI Water API Fluid Losses and 1000 ppm CaCl₂ Fluid Losses

| Base Clay/Polymer/ SAPP Combination | DELTA (mls) "Dry-Mixed" | DELTA (mls) Rehydrated |
|---|---|---|
| Calcium base clay #8 and 25 lb./ton of ALCOMER 228 polymer | 61.8 | 31.3 |

Figure 10:
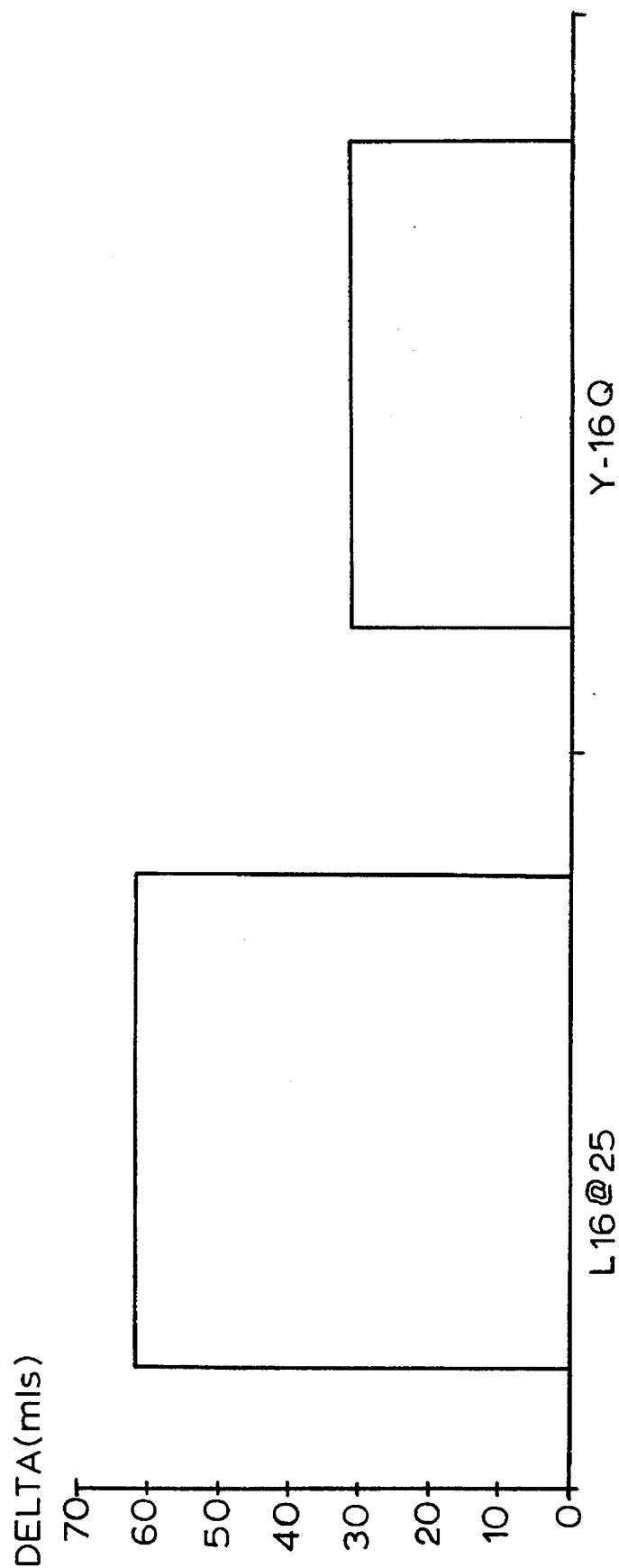
Figure 11:
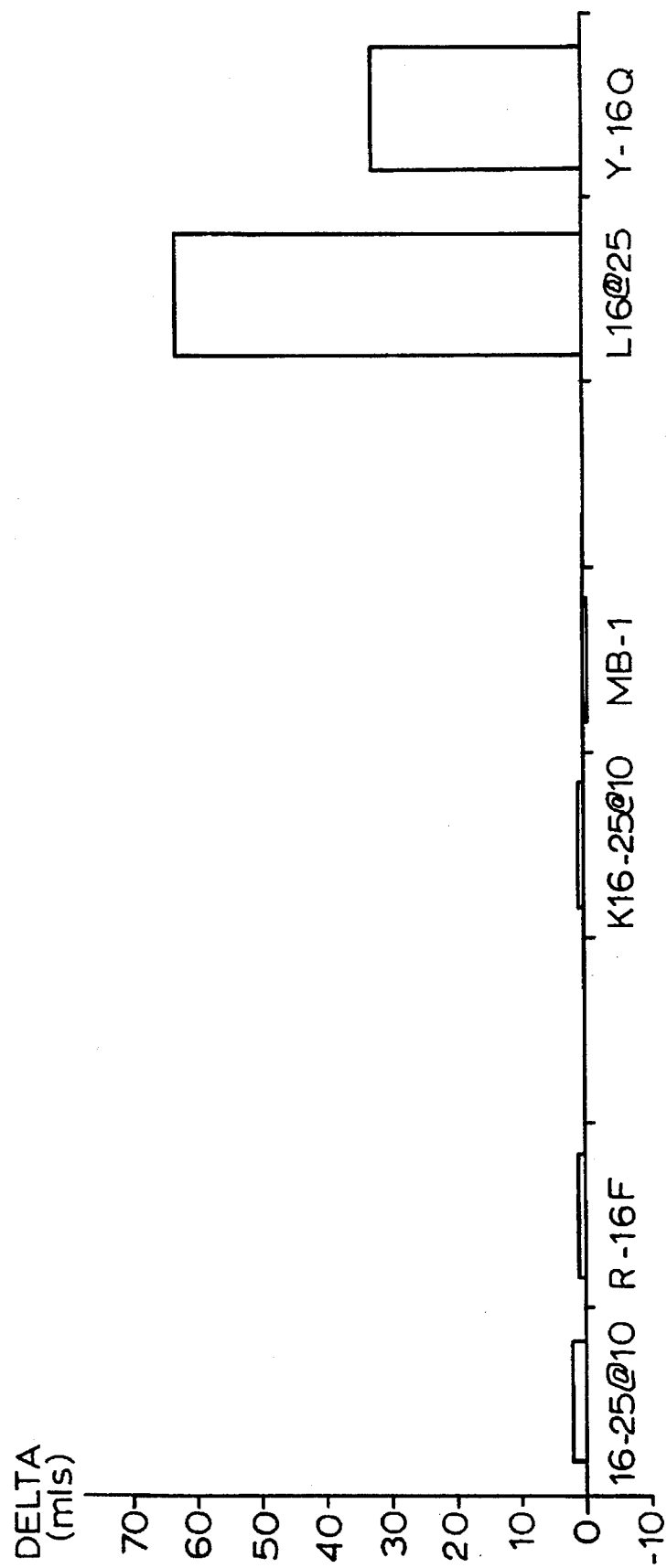

These DELTA values are graphed in FIGS. 9, 10, and 11.

This assignee and/or its subsidiaries produce several products which solidify or thicken waste sludges. One of these products comprises base clay #2 and functions quite well. Samples were prepared by applying the polymer rehydration process to this base clay. Two different polymers were impregnated into separate samples of the base clay. The purpose of this testing was to see if the polymer rehydration process would improve the ability of the clay to withstand contaminants from the waste sludges and therefore better thicken and/or solidify the waste sludges. Table 18 lists the sample descriptions.

TABLE 18

| SAMPLE | DESCRIPTION |
|---|---|
| Base Clay #2 | Base Clay #2 Powdered |
| J1 @ 10 | Dry powdered base clay #2 mixed with 10 lb./ton of Cypan Polymer. |
| J16 @ 25 | Dry powdered base clay #2 mixed with 25 lb./ton of ALCOMER 228 polymer. |
| S-1Q | Base Clay #2 and 10 lb./ton of Cypan Polymer rehydrated up to 50%–55% moisture using Single Rehydration Method, dried and powdered. |
| S-16QB | Base Clay #2 and 25 lb./ton of ALCOMER 228 Polymer rehydrated up to 50%–55% moisture using Single Rehydration Method, dried and powdered. |

The samples were tested with an actual waste sludge. Certain thickened or solidified sludges can be disposed of in certain landfills only if they contain NO free liquids. An ASTM test used to determine the presence of free liquids is the Paint Filter Liquids Test, #9095. In this test, a certain amount of the sludge or sample is placed in a conical fine mesh (#60-U.S. Sieve Series-mesh) filter. If any part of the sample passes through and falls from the filter, the sample is determined to contain free liquids. For the sample waste sludge, comparative paint filter tests were performed using varied amounts of the bentonite samples in the sludge.

Oil and Grease Analysis could not be accurately performed due to the cohesive properties of the oil and grease in the sludge. However, the oil and grease content was estimated at 2–4%.

Paint Filter Liquids Tests #9095 was used for the testing. The sludge 426-2 was weighed into a container. A percentage of thickening sample was added to this weighed amount sludge and thoroughly mixed in. Some of these sludge mixtures were aged for various period before being tested in the paint filter. Please note that the amount of dry sample is described as "percent addition by weight." (Example: 20% addition by weight would be adding 20 grams of dry treated clay sample to 100 grams of sludge.)

TABLE 19

| SAMPLE | Percent Sample Addition by Weight | Amount of Sludge Mixture Passing (grams) 1 hour | Amount of Sludge Mixture Passing (grams) 24 hours |
|---|---|---|---|
| Base Clay #2 | 40 | 0.40 | 0.00 |
| Base Clay #2 | 25 | 7.63 | 12.77 |
| J16 @ 25 | 25 | 7.56 | 7.87 |
| S-16QB | 25 | 0.56 | 0.00 |

It is apparent by Table 19 that at a polymer-impregnated clay dosage rate of 25% addition by weight, the polymer rehydrated sample S-16QB was able to thicken the waste sludge much better than both its "dry-mixed" counterpart sample J16 @25 and Base Clay #2. In fact, at that dosage rate, the S-16QB sample was able to thicken the sludge sufficiently to pass the Paint Filter Test (after 24 hours). Although the J16 @25 sample did not perform as well as the rehydrated S-16QB sample (at 25% addition by weight), it was able to thicken the sludge and hold more free liquids back than the Base Clay #2. At the same dosage rate, Base Clay #2 was not able to thicken the waste sludge as well as the other two samples. In fact, it took a dosage rate of 40% addition by weight of the base clay to thicken the sludge so it would pass the Paint Filter Test (after 24 hours). Due to the limited quantity of the supplied sludge samples, it could not be determined how much of the J16 @25 sample was needed in order to thicken the sludge to pass the Paint Filter Test.

By the above testing, it is apparent that the proposed polymer rehydration treatment process does improve the ability of a smectite clay to thicken and solidify waste sludges.

In addition, the polymer rehydration process was tested for its application in waste water flocculation treatment. These products containing smectite bentonite clay flocculate out certain dissolved impurities and/or suspended water-insoluble contaminants from waste water. The purpose of applying the polymer rehydration process to this application was to see if the rehydration polymer-impregnation process of the present invention would improve the ability of the polymer-treated clay to encapsulate dissolved and/or suspended impurities.

One existing waste water flocculant product is formulated according to U.S. Pat. No. 4,415,467. This composition includes sodium bentonite, an anionic polymer, an acid activated clay, a calcium bentonite, and a cationic polymer. Different samples were prepared by rehydrating different components of the formulation in varying combinations. However, it should be noted that although the components were rehydrated in different combinations, the formulations for each sample were exactly the same. The prepared samples are listed in Table 20.

TABLE 20

| SAMPLE | DESCRIPTION |
|---|---|
| N25 @ 10 | Dry sodium bentonite, acid activated clay, anionic polymer, calcium bentonite, and cationic polymer, dry-mixed. Sample is a powder. |
| WW-1 | Sodium bentonite and anionic polymer rehydrated up to 35% moisture using Single Rehydration Method. The calcium bentonite, cationic polymer and acid activated clay added after. Sample is a power. |
| WW-2 | Calcium bentonite, acid activated clay, and cationic polymer rehydrated up to 50% moisture using Single Rehydration Method. Sodium bentonite and anionic polymer added after. Sample is a powder. |

TABLE 20-continued

| SAMPLE | DESCRIPTION |
|---|---|
| WW-3 | Sodium bentonite, acid activated clay, and anionic polymer rehydrated up to 40% moisture using Single Rehydration Method. Calcium bentonite and cationic polymer added after. Sample is a powder. |
| WW-3G | Sodium bentonite, acid activated clay, and anionic polymer rehydrated up to 40% moisture using Single Rehydration Method, dried and granulated −20, +60 mesh. Calcium bentonite and cationic polymer added after. |
| WW-4 | Sodium bentonite, acid activated clay, and anionic polymer rehydrated up to 40% moisture using Single Rehydration Method, dried and powdered. Calcium bentonite and cationic polymer rehydrated up to 50% moisture using Single Rehydration Method, dried and powdered. The two mixtures were then combined. Sample is a powder. |
| WW-4G | Sodium bentonite, acid activated clay, and anionic polymer rehydrated up to 40% moisture using Single Rehydration Method, dried and granulated −20, +60 mesh. Calcium bentonite and cationic polymer rehydrated up to 50% moisture using Single Rehydration Method, dried and granulated to −20, +60 mesh. The two granular mixture were then combined. |
| WW-5 | Sodium bentonite, anionic polymer, acid activated clay, and cationic polymer rehydrated up to 35% moisture using Single Rehydration Method. The calcium bentonite added after. Sample is a powder. |
| WW-5G | Sodium bentonite, anionic polymer, acid activated clay, and cationic polymer rehydrated up to 40% moisture using Single Rehydration Method, dried and granulated to −20, +60 mesh. Granular calcium bentonite added after. |
| WW-6 | Sodium bentonite, acid activated clay, calcium bentonite, and anionic polymer rehydrated up to 40% moisture using Single Rehydration Method. Cationic polymer added after. Sample is a powder. |
| WW-6G | Sodium bentonite, acid activated clay, calcium bentonite, and anionic polymer rehydrated up to 40% moisture using Single Rehydration Method, dried and granulated to −20, +60 mesh. Cationic polymer added after. |

All of the rehydrated waste water treatment samples were tested against their "dry-mixed" counterpart N25 @98 using an actual waste water sample sent from SKF USA, Inc. Although the treatment dosage rates could have been higher to obtain greater oil and grease removal, the treatment dosage rates were kept low so that the differences in the treatments with each sample would be more evident and measurable.

Oil and Grease Analysis determined that the waste water sample had 16,860 ppm of oil and grease content.

Two dosage rates were selected (1.5 grams/250 mls and 2.0 grams/250 mls), as shown in Table 21. The amounts of waste water were equivalently measured for each sample, as were the amounts of the treatment samples. After the treatment samples were added, the samples were agitated in the same manner for about the same time. The treated waste waters were then filtered and analyzed for oil and grease. Although all rehydrated treatment samples were tested with the waste water sample only, the samples which produced the best stable flocs were filtered and tested.

TABLE 21

| SAMPLE | Oil and Grease (ppm) 1.5 g/250 mls | Oil and Grease (ppm) 2.0 g/250 mls |
|---|---|---|
| N25 @ 10 | 250 | 222 |
| WW-3 | 238 | 207.5 |

TABLE 21-continued

| SAMPLE | Oil and Grease (ppm) 1.5 g/250 mls | Oil and Grease (ppm) 2.0 g/250 mls |
|---|---|---|
| WW-3G | 236 | 219 |
| WW-6 | 216 | 214 |
| WW-6G | 223 | 204.5 |

The above results show that the four rehydrated samples produced lower oil and grease content than the N25 @10 sample. This indicates that the rehydrated samples were able to remove more oil and grease than their "dry-mixed" counterpart N25 @10.

It should be understood that the present disclosure has been made only by way of preferred embodiments and that numerous changes in details of construction, combination and arrangement of parts can be resorted to without departing from the spirit and scope of the invention as hereunder claimed.

What is claimed is:

1. A method of solidifying a sludge comprising mixing a smectite clay with said sludge in an amount sufficient to thicken the sludge so that no free liquid remains after a 24 hour period after the smectite clay and sludge are mixed, the improvement comprising the smectite clay, said smectite clay being treated by impregnating the clay with dissolved polymer from an aqueous solution in an amount of at least 0.5% by weight, based on the dry weight of the clay, and rewetting the clay with water to a moisture content of more than about 12% by weight, based on the dry weight of the clay, and then drying the rewetted, polymer-impregnated clay to a moisture content of about 12% by weight or less, based on the dry weight of the clay.

2. The method of claim 1, wherein the smectite clay is an organophilic clay.

3. The method of claim 2, wherein the sludge includes a contaminant selected from the group consisting of grease, oil, and mixtures thereof.

4. The method of claim 1, wherein sufficient clay is mixed with the sludge to pass ASTM Paint Filter Liquids Test #9095.

5. The method of claim 4, wherein the clay is mixed in the sludge in an amount of about 5% to about 50% based on the weight of the sludge.

6. The method of claim 1 further including grinding the clay prior to impregnating the clay with dissolved polymer.

7. The method of claim 1 further including grinding the clay after drying the rewetted, polymer-impregnated clay.

8. The method of claim 1, wherein the smectite clay is rewetted to a moisture content of about 18% to about 35% by weight based on the dry weight of the clay, prior to redrying.

9. The method of claim 1, wherein the smectite clay is rewetted to a moisture content of at least about 20% by weight, based on the dry weight of the clay, prior to redrying.

10. The method of claim 1, wherein the smectite clay is selected from the group consisting of montmorillonite, beidellite, nontronite, hectorite, sepiolite and samonite.

11. The method of claim 1, wherein the smectite clay is a montmorillonite clay.

12. The method of claim 11, wherein the smectite clay is bentonite.

13. The method of claim 12, wherein the smectite clay is bentonite having sodium as its predominant exchangeable cation.

14. The method of claim 6, wherein the clay is ground so that 100% of the clay passes through a 0.5 mm screen.

15. The method of claim 7, wherein the clay is ground so that 100% of the clay passes through a 0.5 mm screen.

16. A method of stabilizing excavated soil walls comprising slurrying a treated clay in water, in proportions of about 1 part by weight treated clay for every 5 to 50 parts by weight water, and flowing the slurry in contact with the excavated soil wall, the improvement comprising:

said treated clay formed by impregnating a smectite clay with dissolved polymer, from an aqueous solution, in an amount of at least about 0.5% by weight, based on the dry weight of the clay, and rewetting the clay with water to a moisture content of more than about 12% by weight, based on the dry weight of the clay; and drying the rewetted, polymer-impregnated clay to a moisture content of about 12% by weight or less, based on the dry weight of the clay.

17. The method of claim 16, wherein the proportions of treated clay and water in the clay slurry are one part by weight treated clay for every 10 to 30 parts by weight water.

* * * * *